United States Patent [19]

Clark et al.

[11] Patent Number: 5,424,627
[45] Date of Patent: Jun. 13, 1995

[54] MODULAR THYRISTOR CONTROLLED SERIES CAPACITOR CONTROL SYSTEM

[75] Inventors: Kara Clark, Schenectady; Einar V. Larsen, Charlton; Carl A. Wegner, Clifton Park; Richard J. Piwko, Rexford, all of N.Y.

[73] Assignee: Electric Power Research Institute, Palo Alto, Calif.

[21] Appl. No.: 48,132

[22] Filed: Apr. 13, 1993

Related U.S. Application Data

[63] Continuation-in-part of Ser. No. 806,768, Dec. 13, 1991, Pat. No. 5,202,583.

[51] Int. Cl.$^6$ .............................................. G05F 1/00
[52] U.S. Cl. ................................. 323/210; 307/102
[58] Field of Search ............... 323/205, 206, 208, 209, 323/210, 211, 271, 356, 370; 307/102, 105; 322/58; 361/58, 107

[56] References Cited

U.S. PATENT DOCUMENTS

| | | | |
|---|---|---|---|
| 3,703,680 | 11/1972 | Frank et al. | 323/210 |
| 4,188,573 | 2/1980 | Gyugyi et al. | 323/210 |
| 4,292,545 | 9/1981 | Hingorani | 323/210 |
| 4,302,715 | 11/1981 | Putman et al. | 323/210 |
| 4,307,331 | 12/1981 | Gyugyi | 323/210 |
| 4,311,253 | 1/1982 | Putman et al. | 322/25 |
| 4,355,241 | 10/1982 | Hingorani | 307/102 |
| 4,434,376 | 2/1984 | Hingorani | 323/210 |
| 4,438,386 | 3/1984 | Gyugi | 323/210 |
| 4,451,777 | 5/1984 | Gyugi | 323/210 |
| 4,513,240 | 4/1985 | Putman | 323/210 |
| 4,567,423 | 1/1986 | Dobsa et al. | 322/58 |
| 4,607,217 | 8/1986 | Bhargava | 324/78 |
| 4,719,402 | 1/1988 | Brennen et al. | 323/211 |
| 4,724,333 | 2/1988 | Hedin | 307/102 |
| 4,808,843 | 2/1989 | Hedin | 307/102 |
| 4,811,236 | 3/1989 | Brennen et al. | 323/210 |
| 4,843,513 | 6/1989 | Edris | 361/20 |
| 4,999,565 | 3/1991 | Nilsson | 323/210 |
| 5,032,738 | 7/1991 | Vithayathil | 323/211 |
| 5,121,048 | 6/1992 | Larson | 323/210 |

OTHER PUBLICATIONS

Christl, et al., "Advanced Series Compensation (ASC) with Thyristor Controlled Impedance," CIGRE paper 14/37/38-05, Paris, 1992.

Keri, et al., "Improving Transmission System Performance Using Controlled Series Capacitors," CIGRE paper 14/37/38-07, Paris, 1992.

Flexible AC Transmission Systems (FACTS): Scoping Study, vol. 2, Part 1: Analytical Studies, EPRI RP3022-2, Sep. 1991.

Larsen, et al., "Benefits of Thyristor-Controlled Series Compensation," CIGRE paper 14/37/38-04, Paris, 1992.

Urbanek, et al., "Thyristor Controlled Series Compensation Prototype Installation at the Slatt 500 kV Substation," IEEE PES Paper 92-SM-467-1PWRD, Seattle, Jul. 1992.

Larsen, et al., "Thyristor Controlled Series Compensation-Control Design and Dynamic Performance," EPRI FACTS Conference, Boston, May 1992.

*Primary Examiner*—Jeffrey A. Gaffin
*Assistant Examiner*—Peter Ganjoo
*Attorney, Agent, or Firm*—Flehr, Hohbach, Test, Albritton & Herbert

[57] ABSTRACT

A modular thyristor controlled series capacitor (TCSC) system, including a method and apparatus, uses phase controlled firing based on monitored capacitor voltage and line current. For vernier operation, the TCSC system predicts an upcoming firing angle for switching a thyristor controlled commutating circuit to bypass line current around a series capacitor. Each bypass current pulse changes the capacitor voltage proportionally to the integrated value of the current pulse. The TCSC system promptly responds to an offset command from a higher-level controller to control bypass thyristor duty to minimize thyristor damage, and to prevent capacitor voltage drift during line current disturbances. In a multi-module TCSC system, the higher level controller accommodates competing objectives of various system demands, including minimizing losses in scheduling control, stabilizing transients, damping subsynchronous resonance (SSR) oscillations, damping direct current (DC) offset, and damping power-swings.

6 Claims, 23 Drawing Sheets

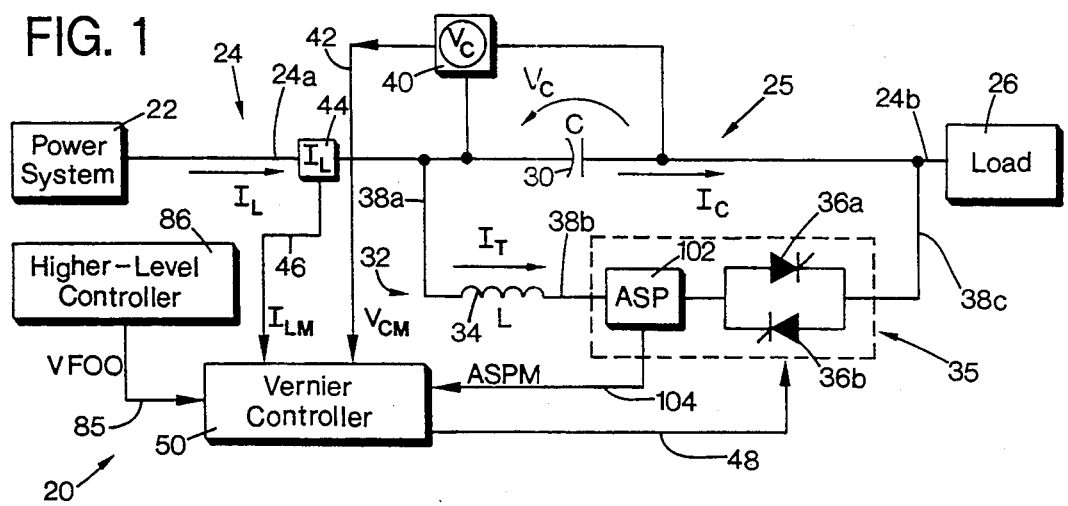
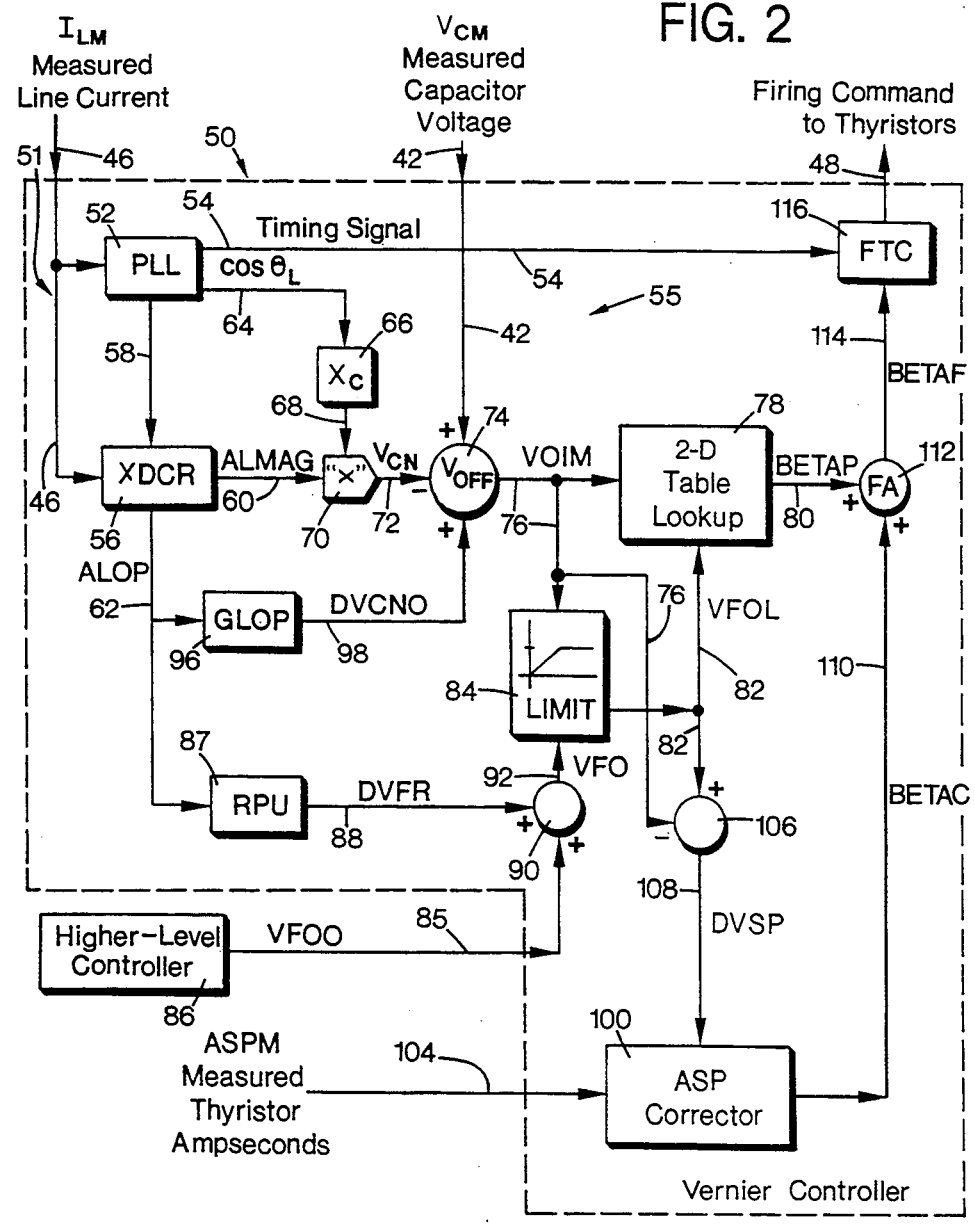

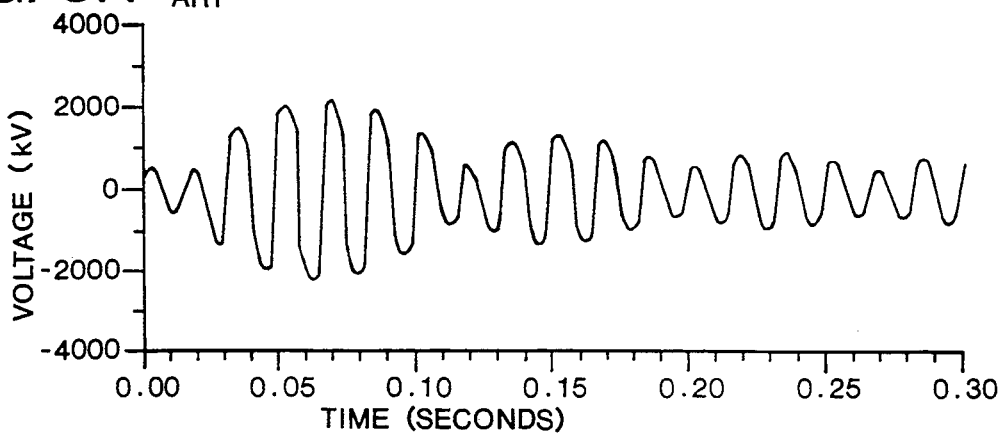
FIG. 8A PRIOR ART — CAPACITOR VOLTAGE
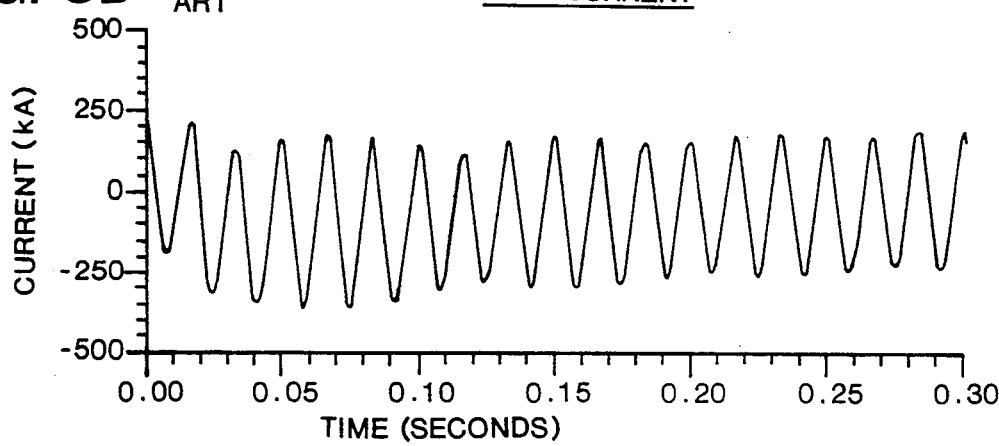
FIG. 8B PRIOR ART — LINE CURRENT
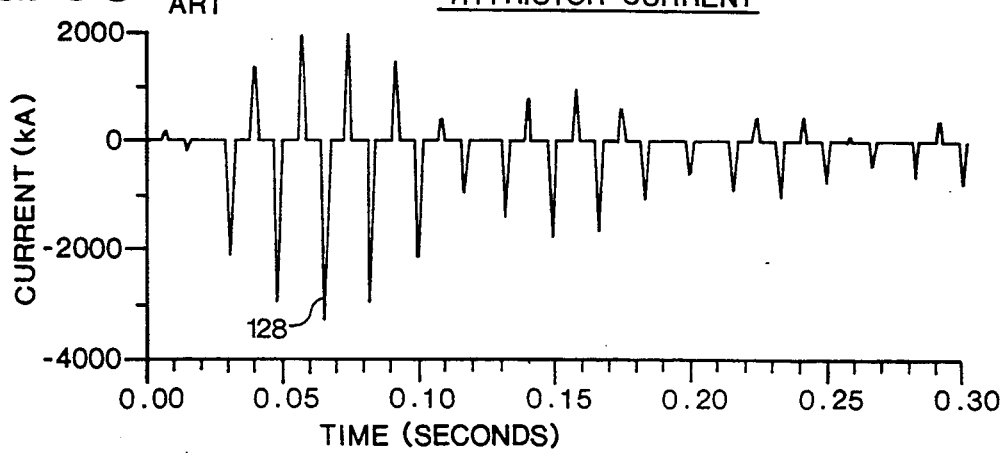
FIG. 8C PRIOR ART — THYRISTOR CURRENT

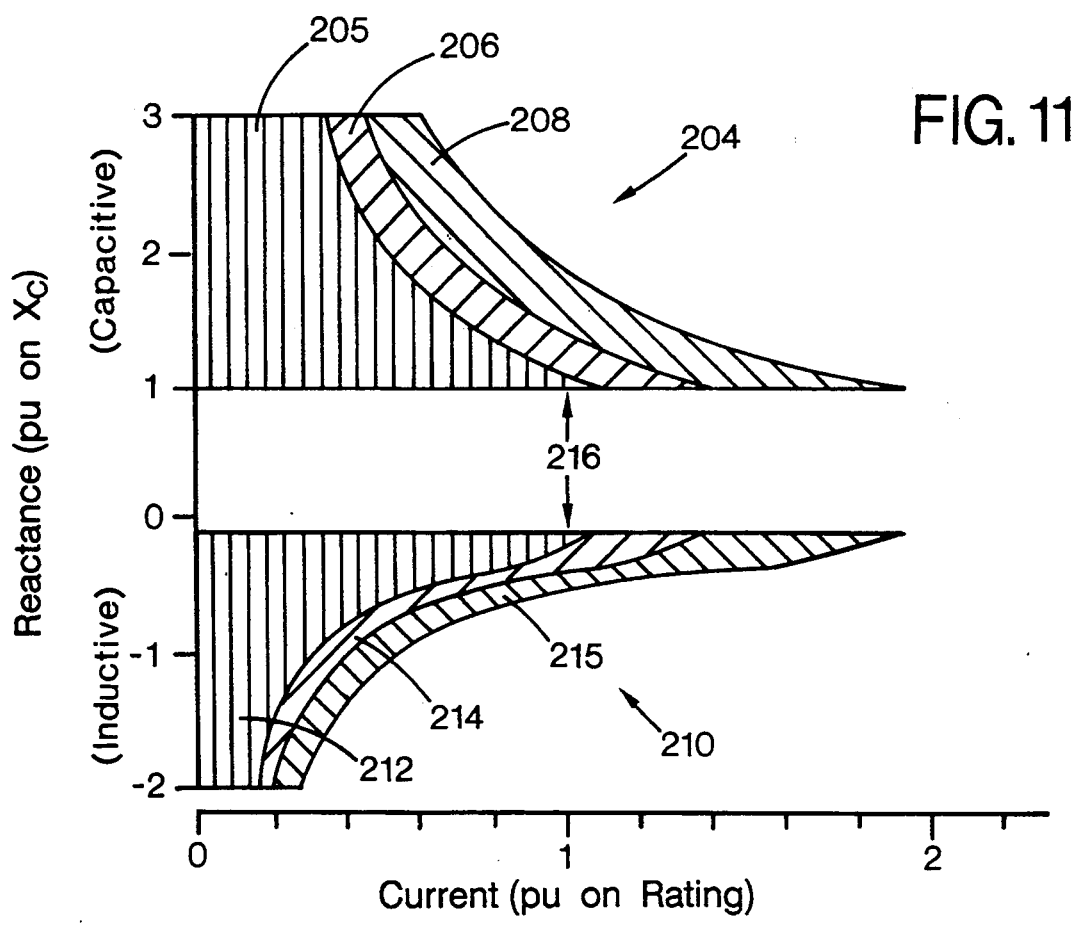

MODULAR THYRISTOR CONTROLLED SERIES CAPACITOR CONTROL SYSTEM

BACKGROUND OF THE INVENTION

This is a continuation-in-part application of the U.S. application Ser. No. 07/806,768, filed on Dec. 13, 1991, granted U.S. Pat. No. 5,202,583, having an issue date of Apr. 13, 1993, which both have at least one co-inventor in common.

The present invention relates generally to a thyristor controlled series capacitor in series with a substantially inductive transmission line. More particularly, the invention relates to a modular order distribution logic firing control system, including a method and an apparatus, for secure vernier operation of a multi-modular thyristor controlled series capacitor system. Such a system may be used in an alternating current (AC) power distribution system to accommodate the competing objectives of various system demands, including minimizing losses in scheduling control, stabilizing transients, damping subsynchronous resonance (SSR) oscillations, damping direct current (DC) offset, and damping power-swings.

Other systems have been proposed for damping subsynchronous oscillations and DC offset in power transmission systems. For example, U.S. Pat. No. 4,292,545 to Hingorani discloses a thyristor controlled capacitor in series with a transmission line. Hingorani's system uses a thyristor valve firing at a fixed time after a zero-crossing of the capacitor voltage. In U.S. Pat. No. 4,434,376 to Hingorani, which is a divisional of the Hingorani '545 patent, this concept is extended to have firing at a variable time after a capacitor voltage zero-crossing. In the Hingorani '376 patent, the firing time is adjusted relatively slowly, based upon a measurement of the frequency of the AC power system network voltage or current. In U.S. Pat. No. 4,355,241 also to Hingorani, overload protection is added by also triggering the thyristor valve in response to an over-voltage across a series reactance. This series reactance comprises a plurality of tuned circuits, each of which may be tuned to a separate undesirable subsynchronous frequency of the power system so the normal system frequency is unimpeded.

One serious drawback to the systems proposed by Hingorani in his '545, '376 and '241 patents (hereinafter and collectively referred to as "Hingorani") is that Hingorani requires several firings of the thyristor valves before the series capacitor voltage finally creeps-up to the desired level. Furthermore, after reaching the desired level, the Hingorani system typically overshoots the desired value. Other disadvantages of the Hingorani system are discussed further below.

In a 1988 paper by J. J. Vithayathil, et al. entitled, "Case Studies of Conventional and Novel Methods of Reactive Power Control on an AC Transmission System," it was suggested that by using partial conduction of an inductor across a series capacitor, the effective compensation level of the series capacitor could be varied over some range in a vernier mode. Vithayathil also suggested that this system could be beneficial for stabilizing power systems. Eventually, Vithayathil received U.S. Pat. No. 5,032,738 for his single module system. However, Vithayathil's inductor is controlled in the same way that a thyristor controlled reactor of a static VAR compensator is controlled, which is essentially the same as the Hingorani system. That is, both the Hingorani and Vithayathil systems are based on timing signals derived from the zero-crossing times of the capacitor voltage. The Vithayathil scheme also involves determining a firing time by assuming a purely sinusoidal voltage across the capacitor which, in actuality, is not a pure sinusoidal waveform.

In a 1990 paper by N. Christl, et al. entitled "Advanced Series Compensation with Variable Impedance," a "thyristor controller" mode is described which is similar to the "vernier" mode discussed further below. Christl shows several waveforms resulting from using the firing delay angle as the controlling variable. N. Christl, et al. published a second paper in 1992, entitled "Advanced Series Compensation (ASC) with Thyristor Controlled Impedance." These papers describe a series capacitor installation at the Western Area Power Administration Kayenta site. The Kayenta installation consists of conventional series capacitors and a single module thyristor controlled capacitor with a vernier capability.

U.S. Pat. No. 4,999,565 to Nilsson describes a multi-module approach for reactive compensation of a transmission line. Nilsson sizes each model to vary the effective compensation in geometric steps between a minimum and a maximum, and is only used in an on/off mode. Nilsson does not attempt any type of smoothing using vernier operation.

A. J. F. Keri, et al., published a 1992 paper entitled, "Improving Transmission System Performance Using Controlled Series Capacitors," which describes the American Electric Power series capacitor installation at the Kanawha River site. The Kanawha River installation consists of three geometrically-sized modules which yield 0-60% compensation in 10% steps. Each Kanawha River module is mechanically switched, with the exception of a thyristor switch on one phase of one module, which is intended only for on/off operation, as described in Nilsson's U.S. Pat. No. 4,999,565.

An Electric Power Research Institute (EPRI) scoping study of Flexible AC Transmission Systems (FACTS), published in September 1991, and a 1992 article by coinventor, E. V. Larsen, et al., entitled "Benefits of Thyristors Controlled Series Compensation," describe the benefits to power systems of a multi-module TCSC system with on/off control. However, these publications point out a number of adverse side effects to using such a system with on/off control. For example, when these earlier multi-module systems with on/off control are inserted in series with the transmission line, the abrupt insertion of the module appears, when viewed from the transmission line, as a straight series capacitance. Such an abrupt insertion of a series capacitance into the transmission line can potentially generate subsynchronous resonance (SSR) problems in the transmission system.

Each of these earlier systems of Hingorani, Vithayathil, and Christl merely discloses a thyristor controlled series capacitor system where the firing of the thyristor valves is based on a time determined from either the actual or the synthesized time of zero-crossings of the capacitor voltage. Nilsson's patent, the Keri et al. article, the EPRI scoping study, and the Larsen et al. article each describe multi-module TCSC systems with on/off control. In sum, these earlier attempts cover mechanically switched series capacitor, single module devices with limited vernier capability, and multi-module devices with either geometric or identically individual modules sizes using on/off operation. These systems are incapable of quickly and precisely damping subsynchronous oscillations and DC offsets in a power transmission system. Moreover, each of these firing systems is slow to respond.

None these earlier systems provides a secure means of controlling a thyristor controlled series capacitor where the actual capacitor voltage responds promptly to a command signal. Furthermore, these earlier systems are incapable of precisely controlling the duty on the thyristors. Additionally, these earlier systems are susceptible to drifting of the capacitor voltage away from a desired setting due to disturbances in the transmission line current.

An effective TCSC system must accommodate the differing objectives of a series of different control functions to arrive at a desired net reactance change to impose on a transmission line. These competing control functions may include scheduling control, power-swing damping control, subsynchronous resonance (SSR) damping control, and transient stabilizing control. For example, the primary objection of scheduling control is to minimize losses, so any gaps in the control range are not a significant consideration. In contrast, power-swing damping control requires a smooth control of the reactance, and minimization of losses is of relatively little concern. Thus, a need exists for a TCSC system which accommodates these competing objectives when combining orders received from the varying control systems, and which then distributes the net command to the individual modules.

Thus, a need exists for an improved firing control system for secure vernier operation of a thyristor controlled series capacitor used in power transmission systems to damp subsynchronous oscillations and DC offset, which is directed toward overcoming, and not susceptible to, the above limitations and disadvantages.

SUMMARY OF THE INVENTION

A firing control scheme, including a method and apparatus, for secure vernier operation of a thyristor controlled series capacitor (TCSC) in series with a transmission line uses phase control firing based on monitored capacitor voltage and line current. The TCSC system has a thyristor switched inductive commutating circuit in parallel with the series capacitor. Vernier operation of the TCSC system is provided by predicting an upcoming firing angle for switching the commutating circuit to conduct a thyristor bypass current pulse therethrough. The current pulse causes an alternating offset component of voltage to appear across the series capacitor, in addition to the normal voltage component. Each current pulse changes the capacitor voltage proportionally to the integrated value of the current pulse. The TCSC system promptly responds to an offset command from a higher-level controller, precisely controls the duty on the bypass thyristors to minimize thyristor damage, and prevents drift of the capacitor voltage away from a desired setting during line current disturbances.

In an illustrated embodiment, a multi-module TCSC system receives and balances the input demands from plural system control requirements, including scheduling control, power-swing damping control, subsynchronous resonance damping control, and transient stabilizing control. A module order distribution logic (MODL) portion routine or device receives demand signals from these various control systems along with an input of the measured line current. In a balancing step, the MODL portion determines the module reactance orders for each of the TCSC modules. Using a voltage order converter, in a conversion step, the measured line current is used to convert the module reactance orders into a final offset voltage signal. The final offset voltage signal may be combined with a subsynchronous resonance voltage control order from an SSR voltage controller portion of the higher level controller. This combined signal is provided as a final offset ordered or command signal output of the higher level controller, which is supplied as an input to the vernier controller for each module.

In the illustrated embodiment, the MODL portion may distribute the signals to the individual modules using either a minimum or a maximum vernier control scheme. The minimum control scheme inserts a module as soon as possible, even if the vernier capability of the modules already inserted is not fully utilized; whereas the maximum control scheme uses all of the vernier capability of the inserted modules before inserting another module.

An overall object of the present invention is to provide a method of controlling a TCSC system for damping subsynchronous oscillations and undesirable DC offset in an AC transmission line.

A further object of the present invention is to provide a TCSC system having smooth vernier operation with performance characteristics superior to existing systems.

Another object of the present invention is to provide a secure means of controlling a TCSC system which responds promptly to a firing command, minimizes damage to the thyristors, and maintains the capacitor voltage at a predetermined level despite power system disturbances.

Still another object of the present invention is to provide a modular TCSC system and control method capable of accommodating the competing objectives of various system demands, including minimizing losses in scheduling control, stabilizing transients, damping subsynchronous resonance (SSR) oscillations, damping direct current (DC) offset, damping power-swings, and the like.

The present invention relates the above features and objects individually as well as collectively. These and other objects, features and advantages of the present invention will become apparent to those skilled in the art from the following description and drawings.

BRIEF DESCRIPTION OF THE DRAWINGS

FIG. 1 is a single line schematic diagram of one form of a single-module thyristor controlled series capacitor (TCSC) system of the present invention, shown in series with a transmission line.

FIG. 2 is a block diagram of one form of a vernier controller of the present invention for controlling the TCSC system of FIG. 1.

FIGS. 6A–9E show the responses of several systems and control variables when subjected to a small system disturbance.

FIGS. 6A, 6B and 6C are graphs for vernier operation of the TCSC system of FIG. 1, with FIGS. 6A–6C showing waveforms of the capacitor voltage, the line current, and the thyristor current, respectively.

FIGS. 8A, 8B and 8C are graphs for the Hingorani system, with FIGS. 8A–8C showing waveforms of the capacitor voltage, the line current, and the thyristor current, respectively.

FIGS. 9A, 9B, 9C, 9D and 9E are graphs for several of the internally controlled variables for the vernier controller of FIGS. 1 and 2, with FIGS. 9A–9D showing waveforms of the variables ALOP, ALMAG, ASPM, and VOIM, respectively, and FIG. 9E showing a waveform of BETAF, which corresponds to BETAP when BETAC is zero.

FIG. 11 is a graph of the capability characteristic, shown in terms of reactance versus line current, for the single-module TCSC system of FIG. 1.

FIG. 13A is a graph of the total actual compensation; FIG. 13B is a graph of the total compensation without vernier control; FIG. 13C is a graph of the upper and lower thresholds for inserting modules; and FIGS. 13D, 13E, 13F, 13G, 13H and 13I are the compensation contributions of the first, second, third, fourth, fifth and sixth modules, respectively.

FIG. 14A is a graph of the total actual compensation; FIG. 14B is a graph of the total compensation without vernier control; FIG. 14C is a graph of the upper and lower thresholds for inserting modules; and FIGS. 14D, 14E, 14F, 14G, 14H and 14I are the compensation contributions of the first, second, third, fourth, fifth and sixth modules, respectively.

FIGS. 17A, 17B, 17C, 17D and 17E are graphs illustrating minimum loss operation with no smoothing.

FIGS. 18A, 18B, 18C, 18D and 18E are graphs illustrating minimum vernier operation with smoothing in the capacitive region only.

FIGS. 19A, 19B, 19C, 19D and 19E are graphs illustrating minimum capacitive vernier operation and inductive operation of bypassed modules for both capacitive and inductive smoothing.

DETAILED DESCRIPTION OF A PREFERRED EMBODIMENT

Figure 3A:
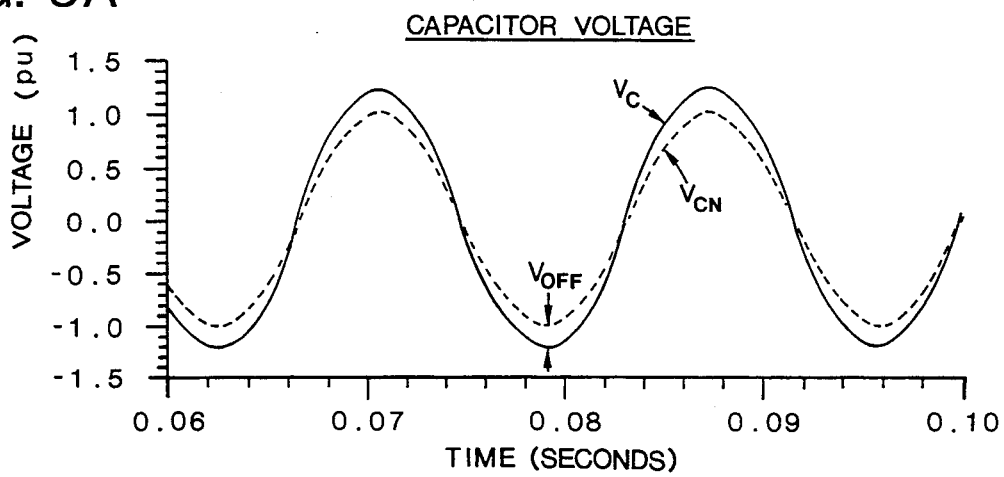
FIGS. 3A, 3B and 3C are graphs of vernier operation of the TCSC system of FIG. 1, with FIG. 3A illustrating the normal and actual capacitor voltages, FIG. 3B showing the line and thyristor currents, and FIG. 3C illustrating the alternating offset voltage component.

FIG. 1 illustrates an embodiment of a thyristor controlled series capacitor (TCSC) system 20 constructed in accordance with the present invention for damping undesirable subsynchronous oscillations and undesirable DC offset occurring in a power system or grid 22. The power system 22 has a transmission line 24 with segments 24a and 24b coupling a single module 25 of the TCSC system 20 in series with the power system 22 and with a load 26, respectively. A line current $I_L$ represents the direction of power flow from the power system 22 to the load 26.

The module 25 has a capacitor ("C") 30 in series with transmission line 24 and an inductive commutating circuit 32 in parallel with the capacitor 30. The capacitor 30 may be a plurality of discrete transistors joined as a capacitor bank having a known capacitive reactance $X_C$. The commutating circuit 32 includes an inductive component, such as an inductor ("L") 34, and a thyristor switch or valve 35 in series with the inductor 34. The thyristor valve 35 has two antiparallel diodes 36a and 36b, hereinafter referred to collectively as thyristors 36 unless otherwise noted. The commutating circuit 32 has conductor segments 38a, 38b and 38c coupling the inductor 34 and thyristor valve 35 with the capacitor 30 and transmission line 24 as shown. In FIG. 1 the following variables are shown: $I_L$ for the line current through transmission line 24, $V_C$ for the actual voltage across capacitor 30, $I_C$ for the current through capacitor 30, and $I_T$ for the bypass thyristor current pulse flowing through the inductor 34 and the thyristor valve 35.

The module 25 includes a voltage monitor or sensor, such as a voltmeter 40, monitoring the voltage across the series capacitor 30. The voltage sensor 40 produces a measured capacitor voltage $V_{CM}$ signal 42 in response to the monitored actual capacitor voltage $V_C$. The TCSC system 20 has a line current monitor or sensor, such as an ammeter 44, monitors the line current $I_L$ flowing through the transmission line segment 24a. The line current sensor 44 produces a measured line current $I_{LM}$ signal 46 in response to the monitored line current $I_L$. The capacitor voltage $V_{CM}$ and line current $I_{LM}$ are preferably measured each half cycle.

The commutating circuit 32 conducts a thyristor current pulse therethrough when the bypass thyristor switch 35 fires to enter a conducting state in response to a firing command or firing pulse signal 48. This firing, preferably ahead of a capacitor voltage zero-crossing, produces an alternating offset voltage component across the series capacitor 30.

Vernier Controller

As shown in FIG. 2, module 25 of the TCSC system 20 includes control means, such as a vernier controller 50. The controller 50 has firing prediction means, such as a firing predictor 51, for receiving the measured line current $I_{LM}$ signal 46, the measured capacitor voltage $V_{CM}$ signal 42, and other signals as described further below, and for predicting therefrom an upcoming firing time at which the firing pulse signal 48 is provided by the controller 50 to the thyristor switch 35. From the description herein, it is apparent that the vernier controller 50 may be implemented primarily in hardware, primarily in software, or various equivalent combinations of hardware and software known by those skilled in the art.

Figure 3B:
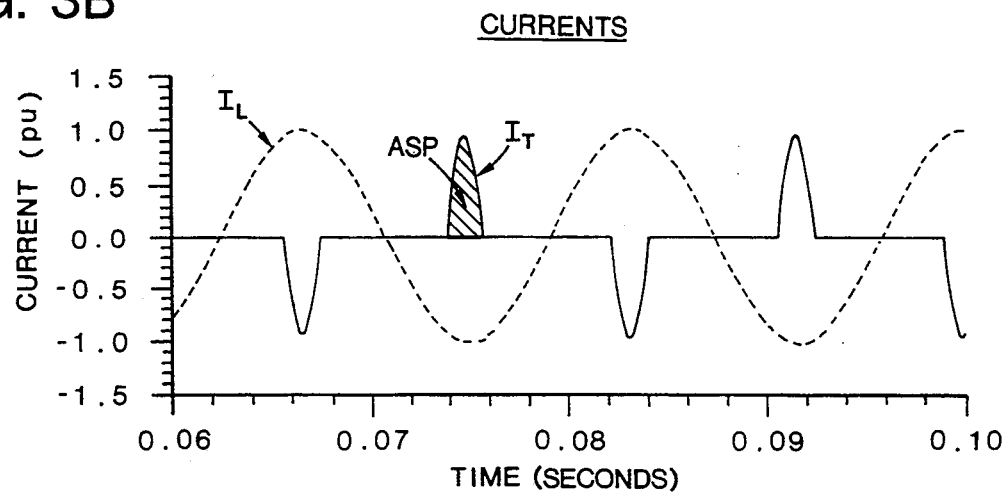
Figure 3C:
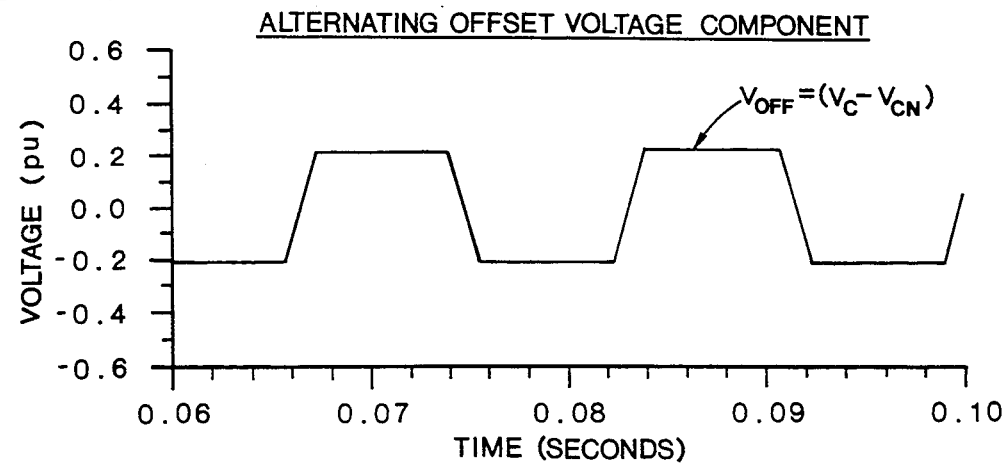

Before describing the operation of the vernier controller 50 in detail, a brief overview of the operation of the TCSC system 20 will be given with reference to the wave shapes of FIGS. 3A–3C. These graphs illustrate the per unit (pu) values of the variables for steady-state operation with 20% vernier control of the capacitor voltage, which is provided in a manner described further below. In FIG. 3A, the actual capacitor voltage $V_C$ includes a normal capacitor voltage component $V_{CN}$ which represents the capacitor voltage that would exist without thyristor firing and with a purely sinusoidal line current $I_L$. The difference between the capacitor voltage $V_C$ and the normal capacitor voltage component $V_{CN}$ is provided by an offset voltage component $V_{OFF}$ shown in FIG. 3C. Each pulse of thyristor current $I_T$ causes a change in the actual capacitor voltage $V_C$ that is proportional to an integrated value of the current $I_T$ in units of ampseconds (ASP), corresponding to the area labeled "ASP" under the $I_T$ current pulses, as shown in FIG. 3B. The following discussion of the operation of the vernier controller 50 also discloses a method controlling the TCSC system 20, and a method of inducing a predetermined voltage offset into the capacitor 30.

Referring again to FIG. 2, the controller 50 is illustrated as a primarily microprocessor based software implementation. The controller 50 has synchronizing means which may comprise a synchronizer or phase locked loop means, such as a phase-locked loop device (PLL) 52. The PLL 52 uses the monitored line current $I_{LM}$ signal 46 to create a first timing reference signal 54 which is in synchronism with the line current $I_L$. The PLL 52 may be implemented in a variety of structurally equivalent hardware and software forms known by those skilled in the art.

The firing predictor 51 includes TCSC parameter prediction means, such as a TCSC parameter predictor, for predicting the value of an upcoming variable or parameter of interest for the power flowing through the TCSC system 20. In the illustrated embodiment, the TCSC parameter prediction means comprises capacitor voltage predicting means, such as a capacitor voltage ($V_C$) predictor 55, for predicting the value of an upcoming initial capacitor offset voltage (VOIM) from the measured line current $I_{LM}$ and the measured capacitor voltage $V_{CM}$. The $V_C$ predictor 55 includes transduction means, such as a transduction device devised or programmed to perform a transduction method or routine (XDCR) 56. The XDCR 56 receives the $I_{LM}$ signal 46 and a second timing signal 58 generated by the PLL 52. In the illustrated embodiment, the second timing signal 58 is the same as signal 54, although in some applications it may be advantageous to have different values for timing signals 54 and 58. From the timing signal 58 and the $I_{LM}$ signal 46, the XDCR 56 determines the magnitude of the transduced line current (ALMAG) and provides a corresponding transduced line current magnitude signal 60. The XDCR 56 also determines an offset component of the line current (ALOP), and provides a corresponding measured line current offset component signal 62. The XDCR 56 may be implemented in a variety of structurally equivalent hardware and software forms known by those skilled in the art.

A further portion of the $V_C$ predictor 55 is provided by a portion of the PLL 52 which determines a sinusoidal $\cos \phi_L$ function and provides a corresponding $\cos \phi_L$ signal 64 in response thereto. The $\cos \phi_L$ function represents an instantaneous point on the line current $I_L$ waveform corresponding to the timing signal 54. The angle $\phi_L$ represents the angle of the AC line current $I_L$ being predicted or estimated when the timing signal 54 is emitted from the PLL 52. The known value of the capacitive reactance $X_C$ of capacitor 30 is multiplied by the $\cos \phi_L$ function signal 64 by factoring means, such as a capacitive reactance factoring routine or device, illustrated as an $X_C$ gain block 66, to provide a factored $\cos \phi_L$ function ($X_C \cos \phi_L$) signal 68.

The $V_C$ predictor 55 also has multiplication means, such as a multiplication routine, shown as a multiplication function block 70. The multiplication function block 70 receives and multiplies together the ALMAG signal 60 and the ($X_C \cos \phi_L$) signal 68 to provide a predicted value of the normal capacitor voltage $V_{CN}$. The predicted normal capacitor voltage $V_{CN}$ is the capacitor voltage which is expected without any firing of the thyristor valve 35 (see FIG. 3A). For example, during steady state conditions, with the ALMAG signal 60 and the capacitive reactance $X_C$ each at a constant value, $V_{CN}$ is a sinusoidal waveform. The multiplier block 70 provides a $V_{CN}$ signal 72 corresponding to this predicted $V_{CN}$ value. The portion of the $V_C$ predictor 55 thus far described, may be referred to collectively as normal capacitor voltage determining device for determining $V_{CN}$ from the monitored line current $I_{LM}$.

The $V_C$ predictor 55 also has comparing means, such as a voltage offset $V_{OFF}$ comparator 74. The $V_{OFF}$ comparator 74 determines an offset voltage component $V_{OFF}$ of the capacitor voltage $V_C$ from the difference between the measured capacitor voltage $V_{CM}$ signal 42 and the predicted normal capacitor voltage $V_{CN}$ signal 72 (see FIGS. 3A and 3C). The comparator 74 expresses this difference by producing a measured initial offset (VOIM) signal 76, which is also the output of $V_C$ predictor 55.

Thus, the $V_C$ predictor 55 predicts the initial capacitor offset voltage VOIM from the monitored line current $I_{LM}$ received from the current sensor 44, and from the monitored capacitor voltage $V_{CM}$ received from the voltage sensor 40. The illustrated $V_C$ predictor 55 includes the portion of the PLL 52 which provides the $\cos \phi_L$ signal 64 and the timing signal 58, the $X_C$ gain block 66, multiplier block 70, the XDCR 56, and the $V_{Off}$ comparator 74.

By knowing this offset voltage component $V_{OFF}$ before firing the thyristor valve 35, the required firing angle may be directly determined so the desired capacitor voltage offset $V_{OFF}$ is obtained at the end of the resulting pulse of thyristor current $I_T$ flowing through the thyristor valve 35. The firing angle to provide the desired voltage offset is easily obtained knowing the physical parameters of the TCSC system circuit, which are primarily the capacitance of the capacitor 30, and the inductance L of inductor 34. To accomplish this, the firing predictor 51 has data storage or memory look-up means, such as a 2-D table look-up table circuit or a programmable data storage device 78. The relationship between these parameters may be precalculated and preprogrammed into look-up circuit or program 78. The look-up circuit or program 78 may be a programmed array, registers, latches or other structurally equivalent data storage and retrieval programs and devices known by those skilled in the art. The look-up circuit or program 78 determines a predicted firing angle and provides a predicted firing angle (BETAP) signal 80 from the VOIM signal 76 and a desired final offset (VFOL) signal 82 corresponding to a desired final capacitor voltage offset value VFOL.

This portion of the vernier controller 50 represents a predictive aspect of the controller which advantageously enhances the performance of this system over the earlier systems, including those of Hingorani. This phase controlled thyristor firing scheme, where the thyristor valve 35 is fired at a predicted upcoming time after a normal zero-crossing firing time, advantageously provides vernier control of the TCSC system 20. Vernier operation refers adjusting and controlling the capacitor voltage $V_C$ in a continuous manner over the entire voltage waveform.

The firing predictor 51 has limiting means, such as a limiter 84, for limiting VFOL signal 82 to limit the maximum duty of the thyristors 36. The limited VFOL signal 82 is based on the difference between the VOIM signal 76 and a final offset ordered (VFOO) or command signal 85. The VFOO command signal 85 corresponds to an ordered offset for the capacitor voltage $V_C$ which may be generated by a higher-level controller 86. The higher-level controller 86 may be provided, for example, by a system dispatcher of the power system 22 to obtain a desired voltage drop across the TCSC system 20. Another example of the higher-level controller 86 is a load control device (not shown) for industrial applications to control the manner in which load 26 appears to the power system 22.

Optionally, the VFOO command signal 85 may be modified to enhance the performance of the TCSC system 20 by providing a resistive component behavior for the TCSC system 20 as seen by the transmission line 24 and power system 22. To accomplish this enhancement, the illustrated controller 50 has resistive modeling modulator means, such as a resistive effect (RPU) modulator 87, for modulating the VFOO command signal 85 upon receipt from the higher-level controller 86. In essence, the resistive effect modulator 87 modulates the VFOO command signal 85 in a manner which causes the overall reaction of the TCSC system 20 to resemble a resistor in the transmission line 24.

The RPU modulator 87 receives the ALOP signal 62 and multiplies signal 62 by an RPU gain value which represents the magnitude of the desired resistive effect. In this manner, the resistive effect modulator 87 provides a modulating voltage (DVFR) signal 88. The VFOO command signal 85 and the DVFR signal 88 are added together by summing means, such as a summer circuit or routine 90, to produce a final offset voltage (VFO) signal 92. It is apparent that without the optional DVFR signal 88, the final offset voltage VFO signal 92 would correspond to the ordered final offset voltage VFOO signal 85.

The illustrated limiter 84 limits the VFOL signal 82 to a maximum limit based on the difference between the initial VOIM signal 76 and the final VFO signal 92. This limiting function advantageously provides a desired direct control of the duty imposed on the thyristors 36a and 36b. The thyristor duty is limited because the amp-seconds ASP value of a pulse of the thyristor current $I_T$ is directly related to the change in the capacitor voltage $V_C$ over the duration of the pulse (see FIG. 3B). It is apparent that other types of limiting functions may be implemented in particular applications to limit the thyristor duty.

Optionally, the vernier controller 50 may have intra-cycle voltage prediction enhancing means, such as a voltage prediction enhancer (GLOP) 96, for enhancing the prediction of the initial capacitor offset voltage VOIM to predict the value of VOIM at a predetermined intra-cycle time during the thyristor current pulse. The GLOP 96 receives the ALOP signal 62 and multiplies it by a GLOP gain value. The GLOP 96 output is a desired or predicted capacitor voltage (DVCNO) signal 98 which predicts an inter-cycle value for $V_{OFF}$, such as when the thyristor current $I_T$ pulse is a certain way through a cycle, for instance, half way through the cycle. The DVCNO signal 98 is added to the $V_{CN}$ signal 72 and the $V_{CM}$ signal 42 by the $V_{OFF}$ comparator 74. This is possible since the offset component of the current ALOP translates to a change in the offset component of capacitor voltage $V_{OFF}$ over time.

The functions of the vernier controller 50 described above encompass a predictive control for the TCSC system 20 which provides the desired system security. This desired security refers to the prompt response of the actual capacitor voltage $V_C$ to the VFOO command signal 85. This security also refers to the ability of the TCSC system to precisely control the duty on the thyristors 36 to minimize damage to the thyristors. This thyristor duty control is provided by the limiter 84 in the illustrated embodiment. Operational security of the TCSC system 20 is also provided because the voltage $V_C$ across the series capacitor 30 does not drift away from a desired setting due to disturbances in the line current $I_L$ flowing through the TCSC system.

To enhance the long term accuracy for the TCSC system 20, the controller 50 has optional correcting means, such as a thyristor ampseconds (ASP) corrector 100, for correcting the predicted firing angle BETAP 80. The ASP corrector 100 provides a feedback path for the actual ampseconds experienced by the thyristors 36a and 36b. This ampsecond value is measured by thyristor monitoring or sensor means, such as a thyristor ampsecond or ASP monitor 102, for monitoring an ampsecond value of the thyristor current $I_T$ pulse flowing through the commutating circuit 32. The ASP monitor 102 may comprise an ammeter for measuring and integrating the thyristor current $I_T$ to determine a value of the ampseconds and provide a corresponding measured thyristor ampsecond (ASPM) signal 104.

The controller 50 has comparing means, such as a comparator 106, for determining a predicted voltage change (DVSP) signal 108 by subtracting the initial VOIM signal 76 from the final VFOL signal 82. The DVSP signal 108 is supplied to the ASP corrector 100. The ASP corrector 100 compares the ASPM signal 104 with the DVSP signal 108 to establish an error signal within the ASP corrector. The ASP corrector integrates this error signal to provide an output of a corrector firing angle (BETAC) signal 110. The controller 50 has summing means, such as a firing angle summer circuit or routine 112, which adds the corrector BETAC signal 110 to the predicted firing angle BETAP signal 80 to obtain a final firing angle command (BETAF) signal 114.

The controller 50 has firing timing means, such as a firing time computer (FTC) 116, for generating the firing command 48 at the upcoming time predicted by the firing predictor 51. The FTC 116 translates the final BETAF signal 114 into the firing pulse signal 48 at the appropriate times in response to the timing signal 54 received from the PLL 52. Upon receiving the firing command 48, the thyristor valve 35 fires to enter a conducting state from a nonconducting state so pulses of thyristor current $I_T$ can flow through the commutating circuit 32.

Performance of the Single-Module TCSC System

Figure 4A:
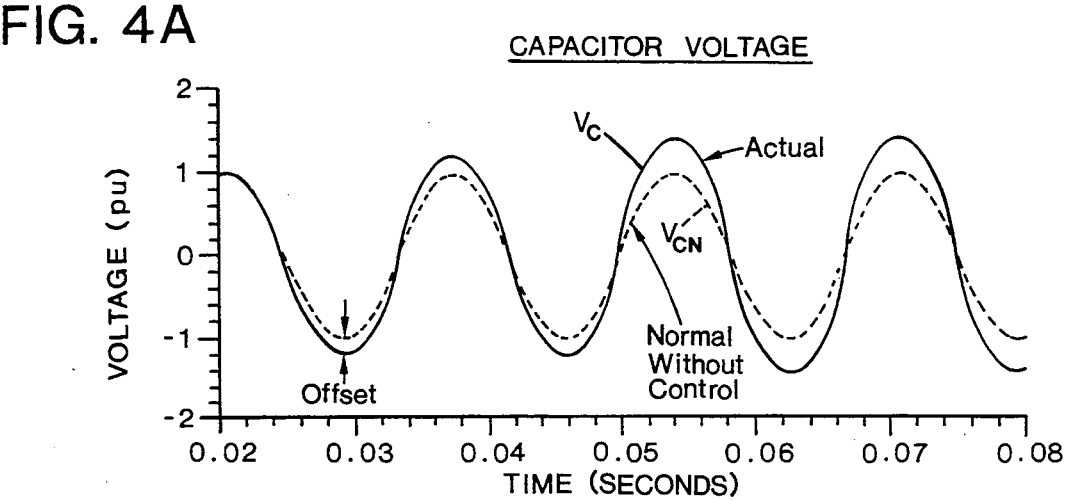
FIGS. 4A, 4B and 4C are graphs of vernier operation of the TCSC system of FIG. 1 acting in response to a step in the commanded capacitor voltage, with FIG. 4A showing the normal and actual capacitor voltage, FIG. 4B showing the thyristor valve current, and FIG. 4C showing the offset order and response.
Figure 4B:
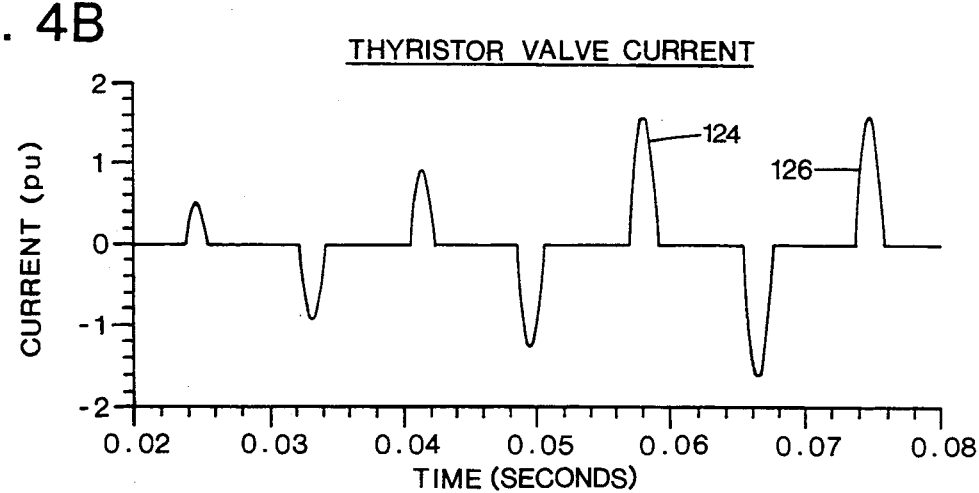
Figure 4C:
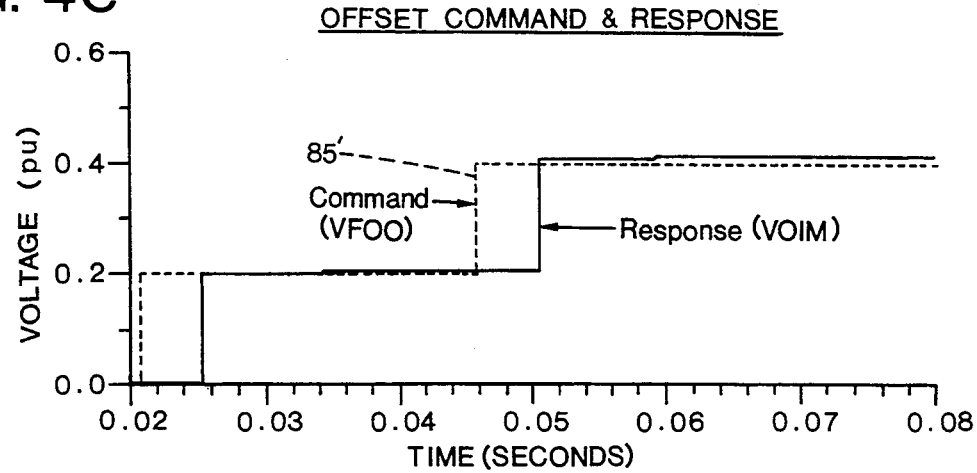
Figure 5A:
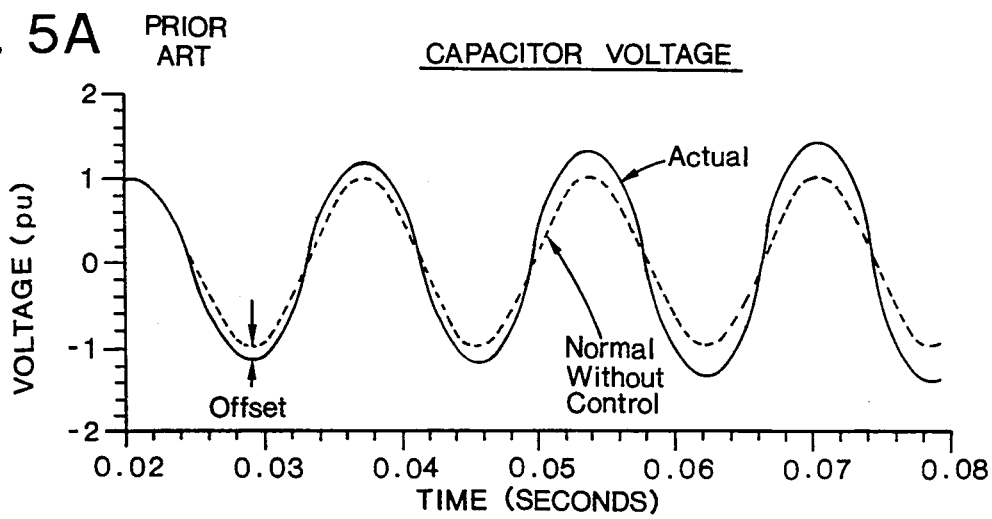
FIGS. 5A, 5B and 5C are graphs of the responses of the prior art Hingorani system acting in response to the same type of step in ordered or commanded capacitor voltage as that of the graphs for FIGS. 4A, 4B and 4C, respectively.
Figure 5B:
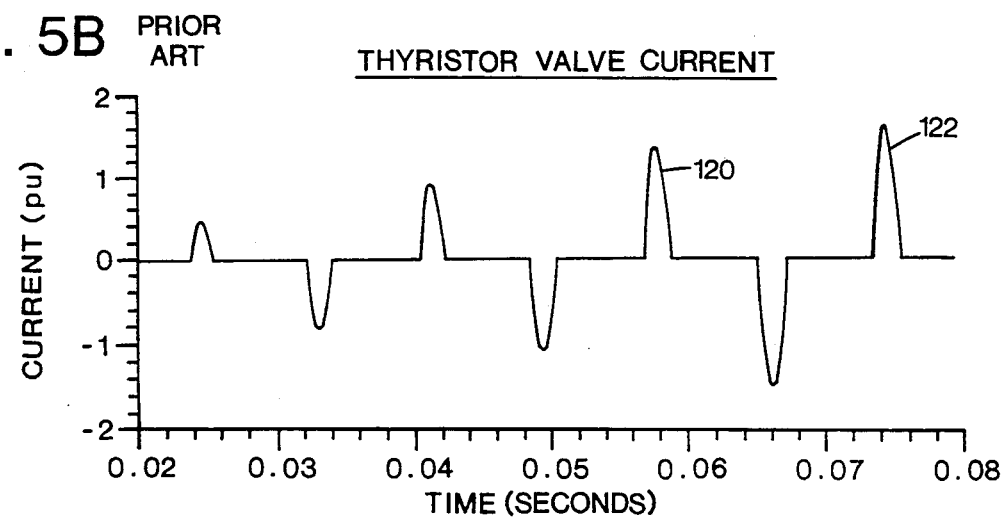
Figure 5C:
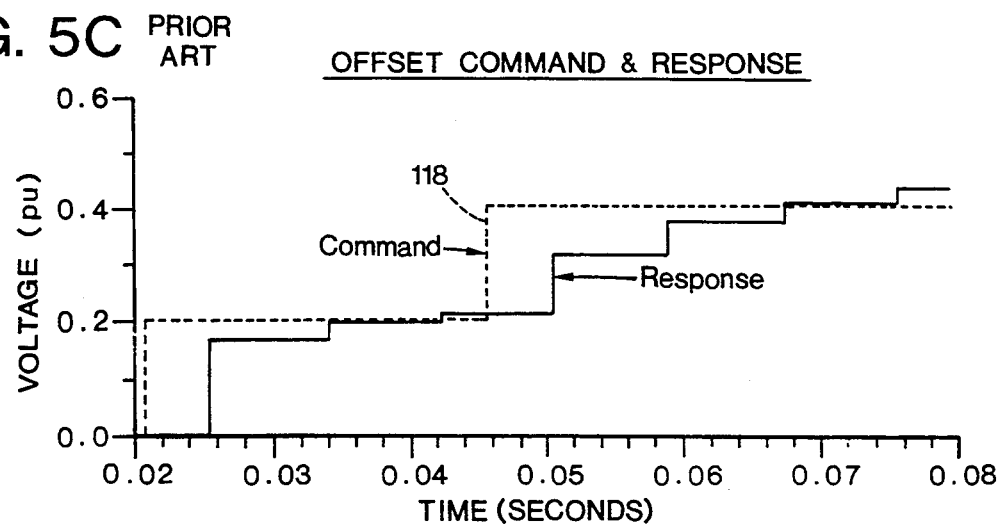

The performance of the TCSC system 20, as shown in FIGS. 4A–4C, is clearly a vast improvement over the operation of the earlier Hingorani system, shown in FIGS. 5A–5C. The wave shapes of FIGS. 4A–4C and 5A–5C show the responses of the system described herein and the Hingorani system, respectively, when subjected to a 0.2 pu (per unit) step change in the ordered capacitor offset voltage.

FIGS. 5A–5C show the Hingorani system slowly creeping upward to the desired level after several valve firings, and then overshooting this desired value. For example, a command 118 to increase the offset voltage is given shortly before 0.046 seconds (see FIG. 5C). As best shown in FIGS. 5B, with a desired thyristor current pulse amplitude of 1.6 pu, a first positive pulse 120 occurring after the command 118 undershoots the desired value, and thereafter, a second positive pulse 122 overshoots this value.

In contrast, the TCSC system 20 provides a prompt response to the VFOO command signal 85', shown in FIG. 4C. For example, the thyristor current pulse amplitude moves promptly to the desired level of 1.6 pu, as shown in FIG. 4B by both positive pulses 124 and 126. Thus, the TCSC system 20 achieves the desired capacitor voltage $V_C$ immediately after the very next valve firing occurring after in the TCSC system 20.

The example of FIGS. 4A–4C illustrates the attainment of the first security objective, namely a fast and accurate response to the VFOO command signal 85 received from the higher-level controller 86. Moreover, these waveforms show that the second security objective of controlling thyristor duty is also satisfied. The thyristor duty is directly related to the change in capacitor voltage on each firing. Thus, precise control of the capacitor voltage also provides precise control of the thyristor duty as well.

The third security objective achieved by the TCSC system 20 relates to the response of the DC offsets in the line current $I_L$. In the absence of any thyristor control, the average capacitor voltage drifts away from the desired zero point if the line current $I_L$ is offset, for example by a system disturbance. This drifting disadvantageously leads to subsynchronous resonance conditions when considering the entire power system circuit comprising an inductive transmission line coupled with a series capacitor. The inductance of the transmission line interacts with the series capacitance to create a series resonant circuit, having a natural frequency which is typically substantially less than the synchronous operating frequency of the AC power system (i.e., 60 Hz for North America). Thus, this natural resonant frequency is referred to as a "subsynchronous frequency."

Figure 6A:
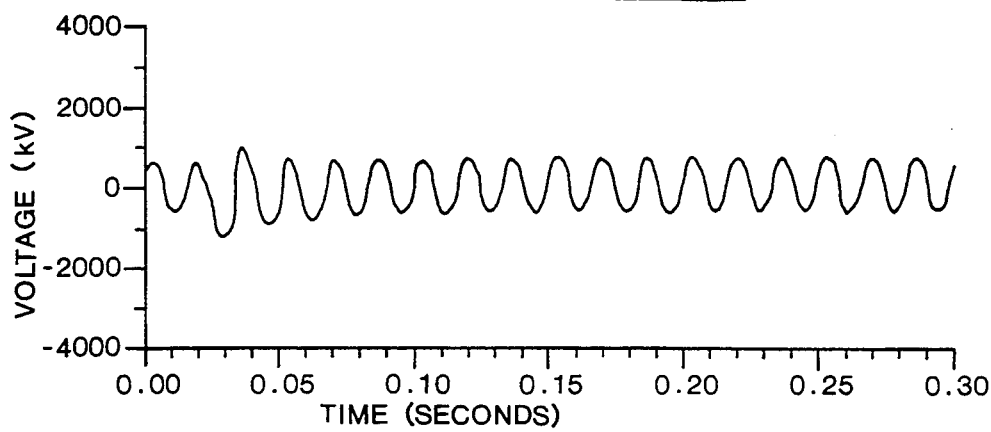
Figure 6B:
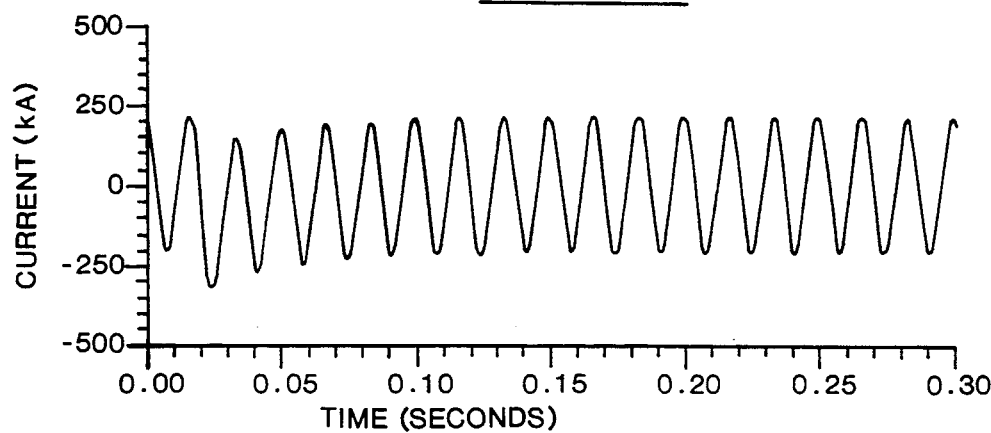
Figure 6C:
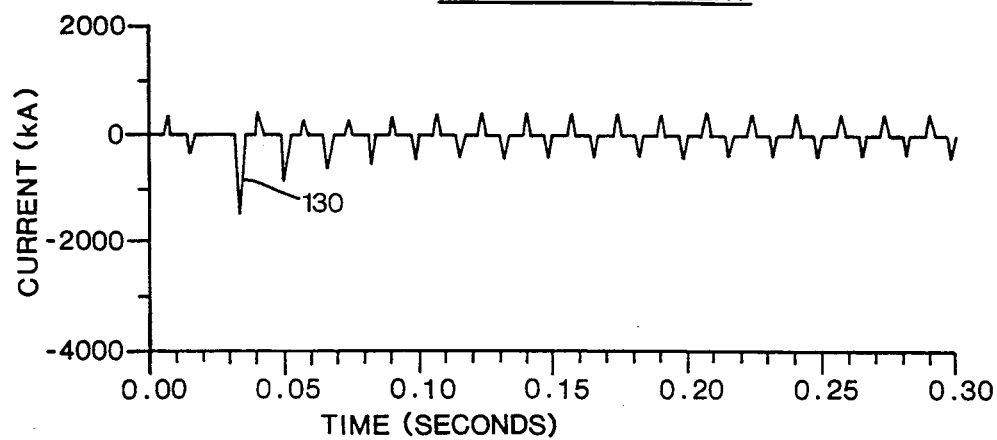

FIGS. 6A–6C illustrate the performance of the TCSC system 20 under subsynchronous resonance conditions when the inductance of the transmission line 24 and the selected capacitance of the series capacitor 30 resonate at 15 Hz. A small disturbance is introduced in the beginning of this simulation around time 0.02 seconds to cause a temporary deviation from steady-state operation. FIG. 6B shows the decay of the DC offset component in the line current $I_L$ back to the 60 Hz zero. The waveforms in FIGS. 6A–6C show recovery back to normal conditions in a smooth and rapid manner using the TCSC system 20.

Figure 7A:
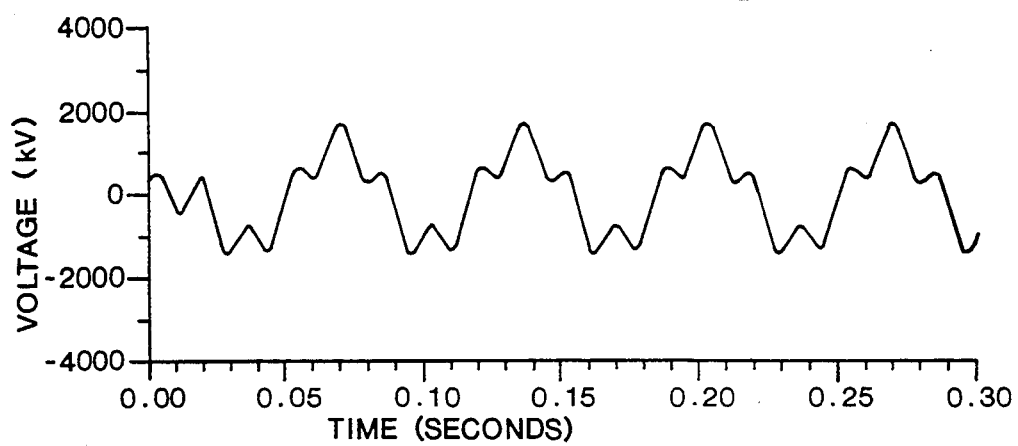
FIGS. 7A and 7B are graphs for a prior art system having no thyristor control, such as a conventional series capacitor application, with FIGS. 7A and 7B showing waveforms of the capacitor voltage, and the line current, respectively.
Figure 7B:
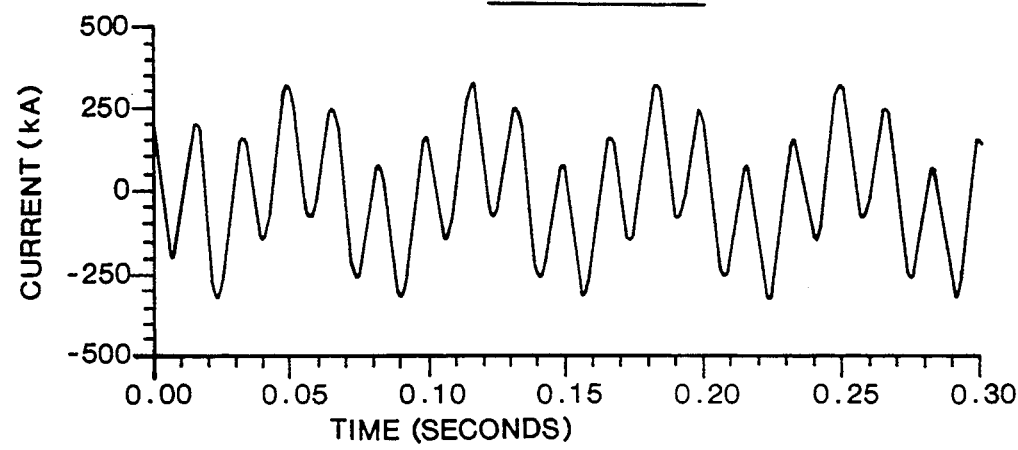

FIGS. 7A and 7B illustrate the response of a conventional series capacitor compensation system having no thyristor control. In contrast with the smooth recovery of the TCSC system 20 in FIGS. 6A–6C, FIGS. 7A and 7B illustrate the nature of response of this circuit if no thyristor control were provided at all. The capacitor voltage waveform of FIG. 7A, and the line current waveform of FIG. 7B, each display a clear 15 Hz component in the waveforms after the initiation of the disturbance. Furthermore, the waveforms of FIGS. 7A and 7B show only a very small damping of the disturbance.

FIGS. 8A–8C show the response of the Hingorani system when used in a network having a transformer line inductance and a series capacitance chosen to resonate at 15 Hz. FIGS. 8A–8C show the response of the Hingorani system when subjected to a small system disturbance on the same order as that applied to the TCSC system 20 for FIGS. 6A–6C. A comparison of FIG. 8A with FIG. 7A, and FIG. 8B with FIGS. 7B, shows that the Hingorani system provides an improved response over a circuit lacking any type of thyristor control. However, a comparison of the capacitor voltage traces of FIG. 6A with FIG. 8A, as well as the line current waveforms of FIGS. 6B and 8B, clearly shows that the TCSC system 20 provides significantly faster damping of the transient activity. The firing time prediction method of the TCSC system 20 contributes to this quick response, as well as the choice of a more accurate reference time than that of the earlier systems.

Furthermore, by comparing the thyristor current of FIG. 8C with that of FIG. 6C, it is clear that the TCSC system 20 significantly reduces the duty seen on the thyristors 36. For example, a maximum negative pulse 128 of the Hingorani system (see FIG. 8C) has an amplitude over 3,000 kA. In contrast, a maximum negative thyristor current pulse 130 shown in FIG. 6C has an amplitude of approximately one half that experienced in the Hingorani system. Therefore, by decreasing the peak current through the thyristor valve 35, the duty on the thyristors is significantly reduced, and consequently, the lifetime of thyristors 36 is increased.

Figure 9A:
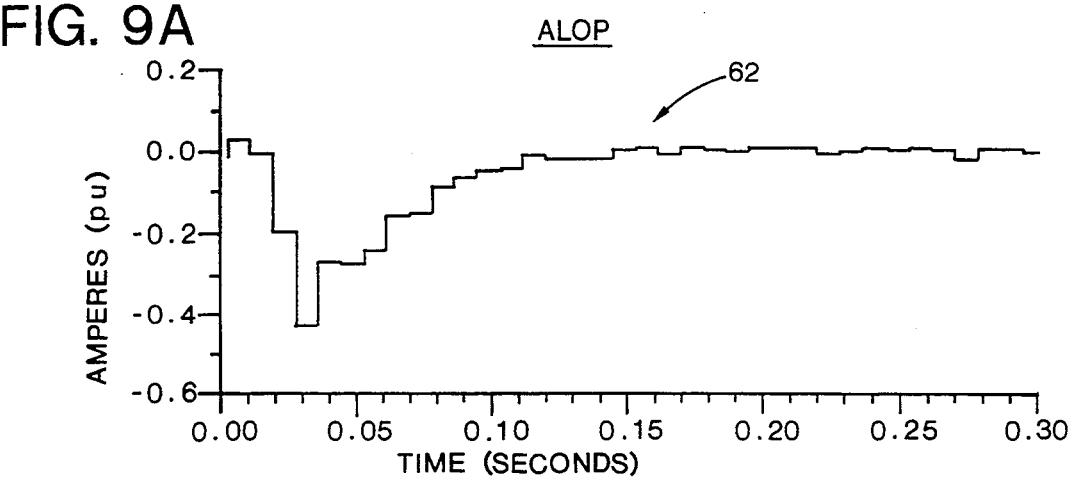
Figure 9B:
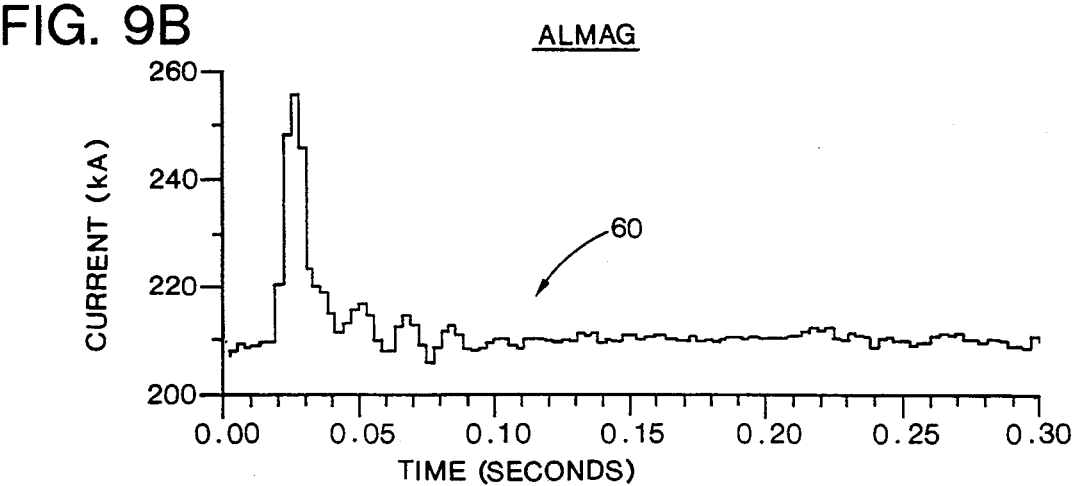
Figure 9C:
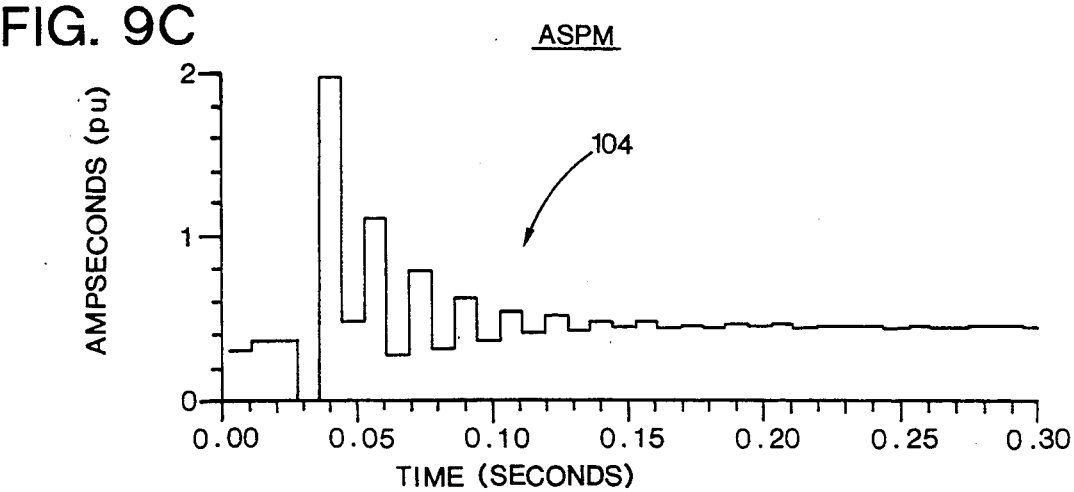
Figure 9D:
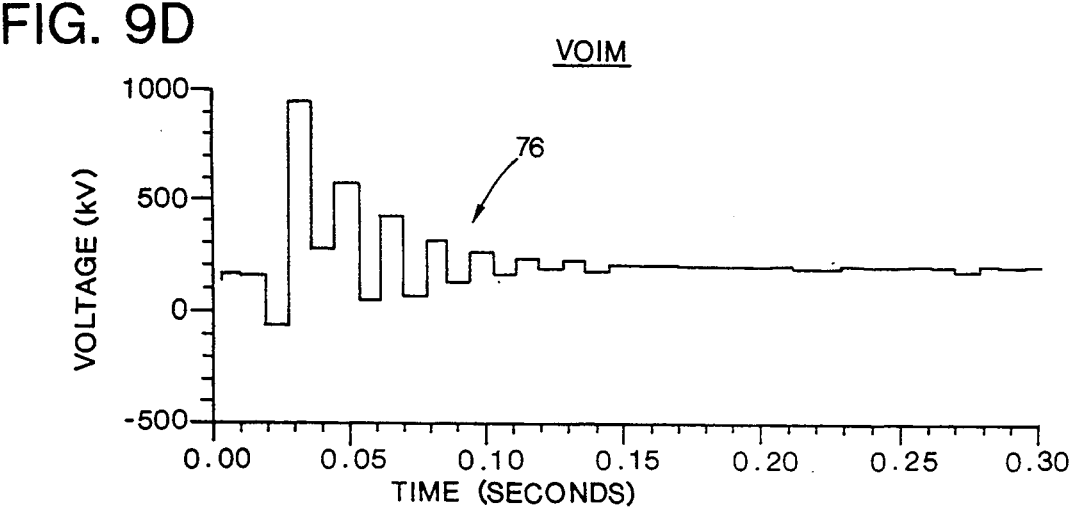
Figure 9E:
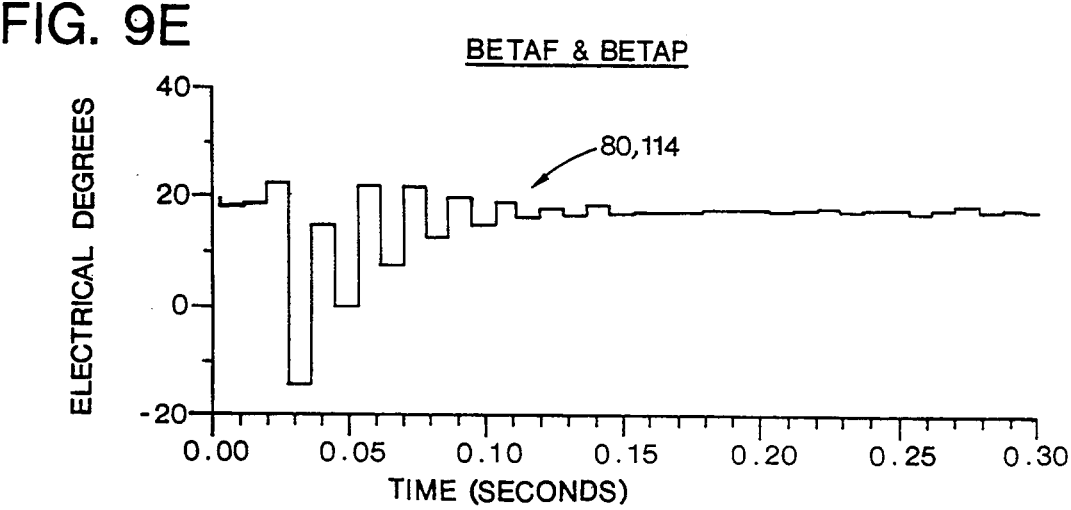

FIGS. 9A–9E show the traces of several of the internal control variables in controller 50 for the 15 Hz subsynchronous resonance frequency example and the small disturbance of FIGS. 6A–6C. FIG. 9A illustrates the measured line current offset component ALOP signal 62 provided by the XDCR 56. FIG. 9B shows the line current magnitude ALMAG signal 60, also produced by the XDCR 56. FIG. 9C shows the measured thyristor ampsecond ASPM signal 104, measured by the ASP monitor 102. FIG. 9D illustrates the output of the $V_C$ predictor 55 portion of the controller 50, that is, the VOIM signal 76 produced by comparator 74, which is indicative of the initial offset before the thyristor current pulse. FIG. 9E illustrates the waveforms of the predicted firing angle BETAP signal 80 and the final firing angle command BETAF signal 114 when the BETAC correction signal 110 is zero.

MODULAR TCSC SYSTEM EMBODIMENT

Figure 10:
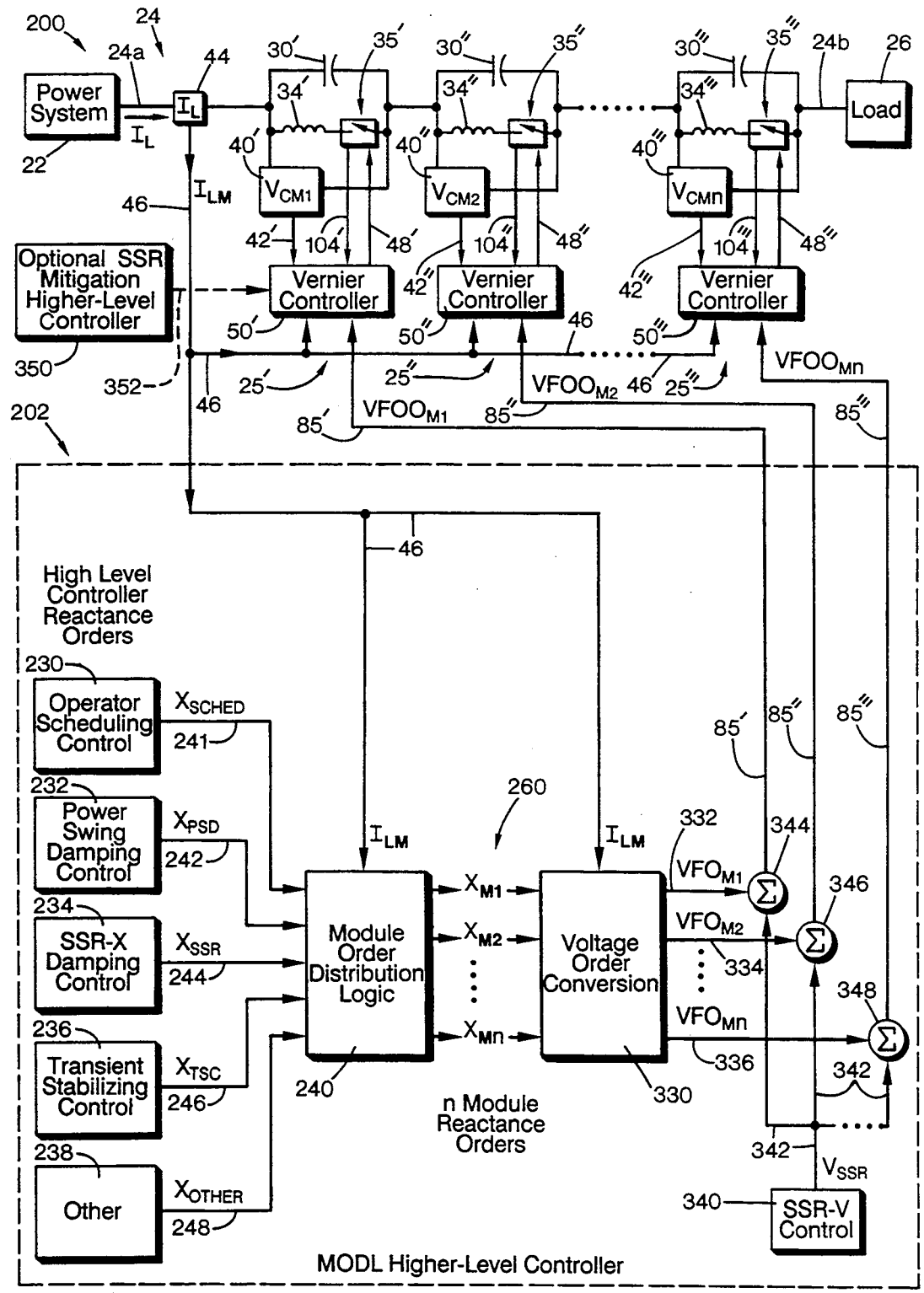
FIG. 10 is a single line schematic block diagram of one form of a multi-module TCSC system with an MODL higher-level controller of the present invention.

FIG. 10 illustrates an embodiment of a modular or multi-module thyristor controlled series capacitor (TCSC) system 200 constructed in accordance with the present invention. The illustrated multi-module TCSC system 200 has plural modules preferably coupled in series, such as a first module 25', a second module 25" and more modules if needed, up to a last nth module 25'''. The capability to add additional modules is shown by the dotted lines separating the second module 25" and the last module 25'''. Each of the modules 25', 25" and 25''' may be constructed as described for module 25 in FIG. 1, with item numbers assigned to components in each module sharing the same prime designator as the module, and variables including the appropriate "Mn" subscript.

For example, the first module 25' has a $C_{M1}$ capacitor 30' in series with the transmission line 24. The first module 25' has a commutating circuit 32' with an inductor 34' in parallel with capacitor 30' to selectively bypass capacitor 30' upon operation of thyristor valve 35'. For simplicity, the thyristor valve 35' has been illustrated in FIG. 10 as a switch. Each thyristor valve 35', 35", 35''' is understood to be in series with a thyristor ampsecond (ASP) monitor (omitted for clarity), which may be as described above for the ASP monitor 102 in FIG. 1. The inclusion of the ASP monitor in valve units 35', 35" and 35''' is apparent from the ASPM output signals 104', 104" and 104''' respectively Each module also includes a voltage monitor or sensor, such as a $V_{CM1}$ voltmeter 40' for the first module 25', which monitors the voltage across capacitor 30'. The sensor 40' produces a measured capacitor voltage signal 42'.

The multi-modular TCSC system 200 includes a vernier controller for each module 25', 25" and 25''', such as the respective vernier controllers 50', 50" and 50'''. Each vernier controller receives inputs of the measured capacitor voltage signal and the ASPM signal. For example, the vernier controller 50' receives signal 42' from sensor 40', and an $ASPM_{M1}$ output signal 104' from an ASP monitor (not shown) within valve unit 35'. Each of the vernier controllers 50', 50" and 50''' receives an $I_{LM}$ measured line current signal 46 from line current sensor 44 in the same manner as described above for FIG. 1. From these inputs, each vernier controller 50', 50" and 50''' provides a firing command or firing pulse signal to the associated thyristor valve in the same manner as described above for the vernier controller 50 of FIG. 1. For example, the vernier controller 50' provides a firing command signal 48' to the thyristor valve 35'.

To coordinate firing of the thyristor valves 35', 35" and 35''' for designating which capacitor(s) 30', 30" or 30''' are inserted in series with line 24, and when, the modular TCSC system 200 may include a modular order distribution logic (MODL) higher-level controller 202. Before beginning a detailed discussion of the operation of the MODL controller 202, the limitations of a single-module TCSC system will be described to better illustrate the particular need and applications for the multi-module TCSC system 200.

Single-Module Versus Multi-Module TCSC Systems

Referring now to FIG. 11, the operational capability of a single-module TCSC system, such as the TCSC system 20 shown in FIG. 1, is illustrated in terms of reactance versus line current. For operation in a capacitive region 204 (positive reactance), the maximum firing advance ($\beta$) of the thyristor valve 35 limits the capability up to a value of line current where the maximum module voltage finally constrains operation. This maximum voltage constraint is typically considered in terms of three different durations: continuous, 30 minute, a few seconds (on the order of 1 to 10 seconds, depending upon system requirements). In FIG. 11, these capacitive capability constraints are shown on the graph with different shading lines, as a continuous region 205, a 30 minute region 206, and a few seconds region 208.

Operation in an inductive region 210 (negative reactance) is limited by the maximum firing delay ($\alpha$) at low line currents, and by the maximum $I_T$ thyristor current at high line currents. Between these constraints, inductive operation is subject to an additional minimum limiting level is related to harmonics, and the additional heating they cause in any surge reactor (not shown) and the thyristor valve 35. These undesirable harmonics may also cause crest voltages which approach the voltage withstand capability of the series capacitor 30. The limitations imposed by the harmonics may be considered as a constant minimum voltage limit.

These minimum inductive voltage constraints are also considered in terms of a continuous duration, a 30 minute duration, and a duration of a few seconds, as describe above for capacitive operation. In FIG. 11, these inductive constraint durations are shown on the graph with different shading lines, as a continuous region 212, a 30 minute region 214, and a few seconds duration region 215.

In reviewing FIG. 11, it is apparent that a large performance gap 218 occurs in the control range between capacitive operation region 204 and inductive operation region 210. FIG. 11 also illustrates the dramatic reduction in the dynamic operational range as the $I_L$ line current increases, as is apparent from the narrowing of the tip portion to the right of regions 204 and 210.

While vernier operation of the single-module TCSC system 20 may increase the apparent reactance in both capacitive and induction directions, vernier operation cannot produce smaller values of reactance. Therefore, the gap 218 between the capacitive region 204 and the inductive region 210 cannot be narrowed using the single-module system 20. This drawback is also experienced by the earlier TCSC systems discussed in the Background section above.

Figure 12A:
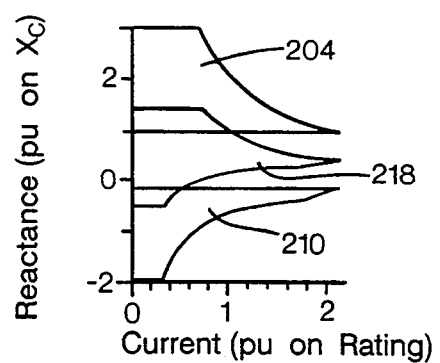
FIG. 12A, 12B, 12C, 12D and 12E are graphs of multi-module TCSC capability characteristics in terms of reactance versus line current for systems having two, three, four, five and six modules, respectively.
Figure 12B:
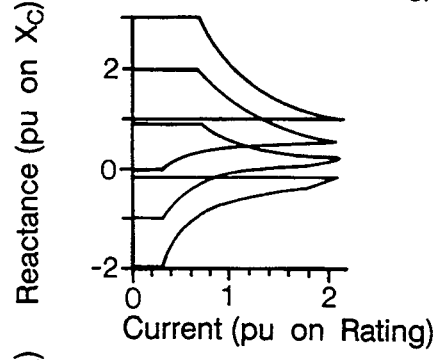
Figure 12C:
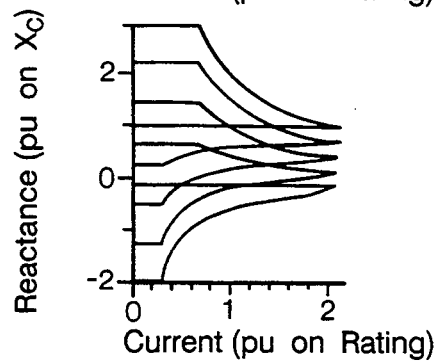
Figure 12D:
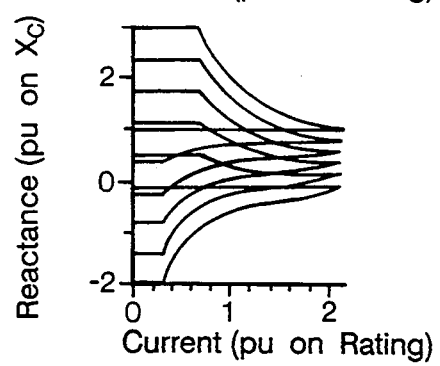
Figure 12E:
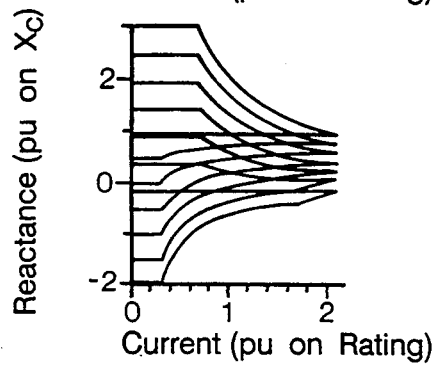

Referring to FIGS. 12A, 12B, 12C, 12D and 12E, the effects of a multi-module TCSC system 200 are illustrated for systems having total or nth modules of two, three, four, five and six, respectively. For example FIG. 12A shows the capacitive and inductive operational regions 204 and 210 of a first M1 module, such as the module 25', and a third operational region 218 provided by a second M2 module, such as module 25". It is apparent from viewing FIGS. 12B through 12E, that the effect of adding subsequent modules is to provide a smoother control of the reactance added to transmission line 24. Moreover, performance is improved for applications requiring secure damping of power swings or power flow regulation on adjacent transmission lines (not shown).

Minimum and Maximum Vernier Distribution Control Schemes

The timing chosen for insertion of the capacitors 30', 30" and 30'" of the first, second and last modules with respect to one another defines the degree of vernier control applied to by the modular system 200. While various degrees of vernier control may be implemented, examples will be discussed for minimum and maximum vernier control. In both distribution schemes, the distribution logic of the MODL controller 202 compares the selected compensation order with established thresholds for adding modules or removing modules, as discussed further below with respect to FIGS. 15, 16A and 16B.

The thresholds for adding or removing modules are a function of the number of modules having capacitors coupled in series with the line 24, the module size or rating, the maximum vernier capability, the hysteresis characteristic of the modules. The bypass impedance refers to the impedance of a module when it is bypassed, such as when valve 35' conducts to divert the line current through inductor 34', rather than through capacitor 30'.

The MODL controller 202 will add, by allowing current to flow through capacitor 30' for instance, modules when a desired compensation order exceeds an upper threshold value for that module. When the selected compensation order falls below a lower threshold value for a module, the module will be bypassed by triggering the valve 35', for instance, to conduct When the selected compensation order is between the upper and lower thresholds, the existing level of compensation is maintained and the thyristor valve 35' will continue in the same conducting or nonconducting state.

Referring to FIGS. 13A–13I and 14A–14I, the compensation contributions of the modules of a six-module system 200 are shown plotted against the total compensation order in per unit. FIGS. 13A–13I illustrate a control scheme of minimum vernier distribution control, whereas FIGS. 14A–14I illustrate a maximum vernier distribution control scheme. In this example, each module has a bypass impedance, such as through inductor 34', of −0.1 per unit (pu). Each module has an inserted impedance, for capacitor 30' for instance, of between +1.0 pu and +1.0 pu plus the maximum vernier rating of the capacitor 30'. Each of the modules, such as module 25', has a 10% hysteresis.

Each of the six modules are operated with a 40% vernier, that is, 40% over the 1.0 pu rated value of capacitive reactance. The 1.0 pu rating, of capacitor 30' for instance, is the continuous through current rating of capacitor 30', which is also a function of the capacitor voltage $V_{CM1}$. The line current is monitored by sensor 44, and the capacitor voltage is monitored by sensor 40'. The capacitor transient overload capability is an inverse relationship, with the capacitor withstanding higher limits for short durations, and lower limits for longer durations.

Figure 13A:
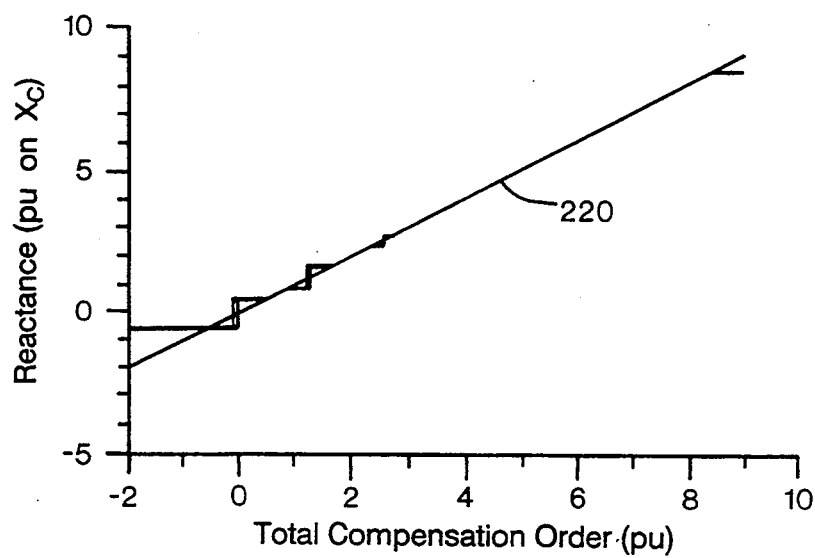
FIGS. 13A–13I are graphs of minimum vernier distribution control, in terms of the total compensation order, of the TCSC system of FIG. 10 for a six module TCSC embodiment, where.
Figure 14A:
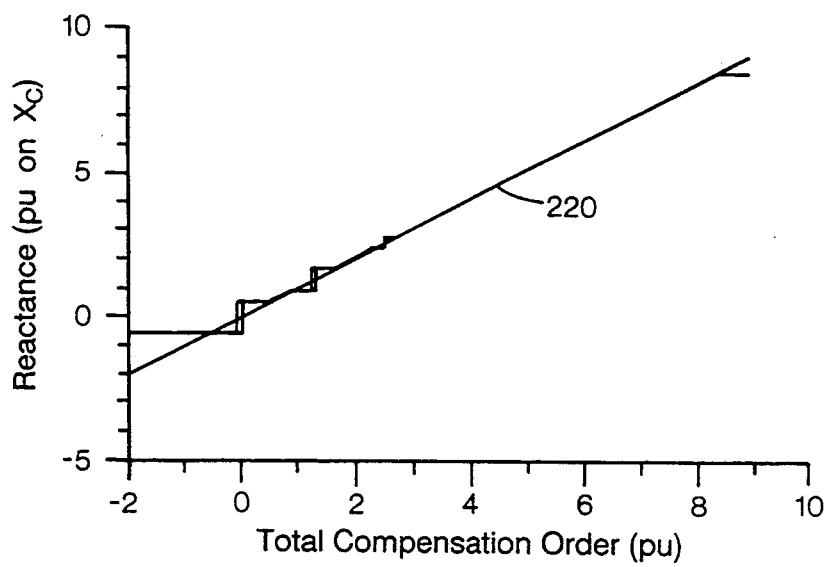
FIGS. 14A–14I are graphs of maximum vernier distribution control, in terms of the total compensation order, of the TCSC system of FIG. 10 for a six module TCSC embodiment, where.

FIGS. 13A and 14A illustrate the total actual compensation as being centered around line 220, which are values where the actual compensation provided by the modules equals the compensation ordered by the MODL controller 202. When the first few modules are added, the actual compensation appears as a step-wise plot, falling short, then overshooting the ordered compensation. As more modules are added, the actual compensation meets the ordered compensation.

Figure 13B:
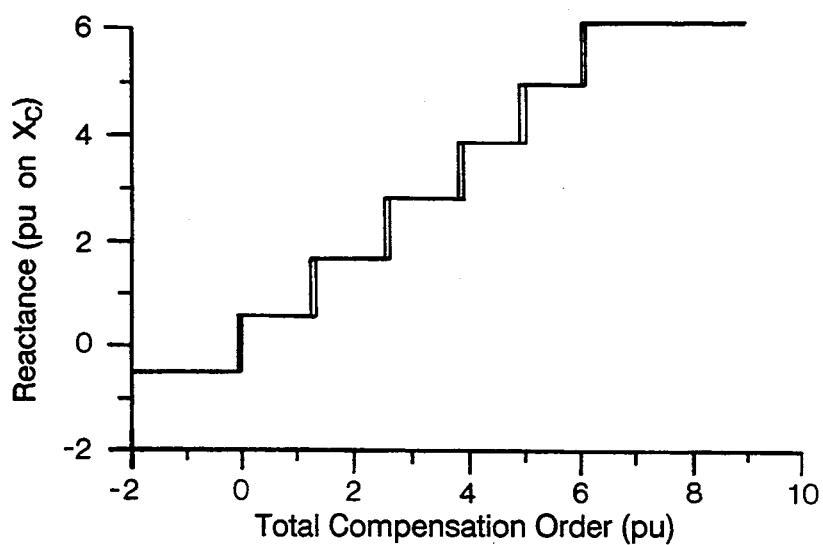
Figure 13C:
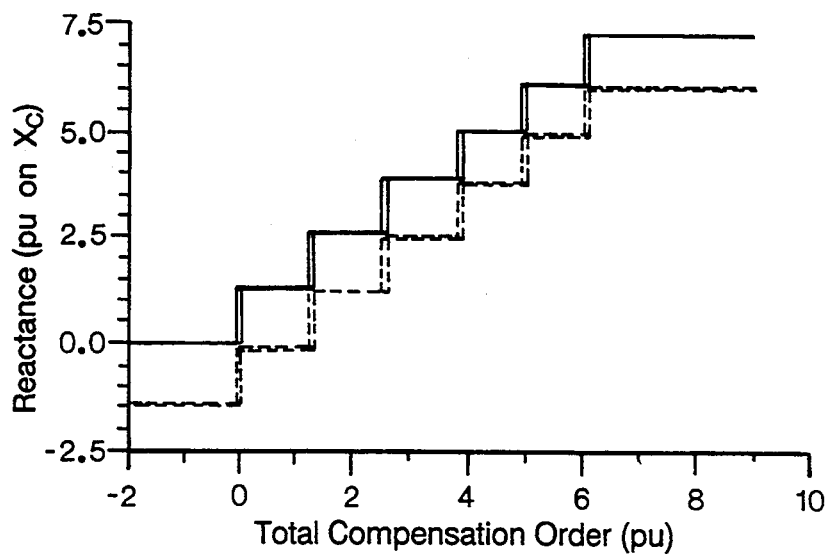
Figure 13D:
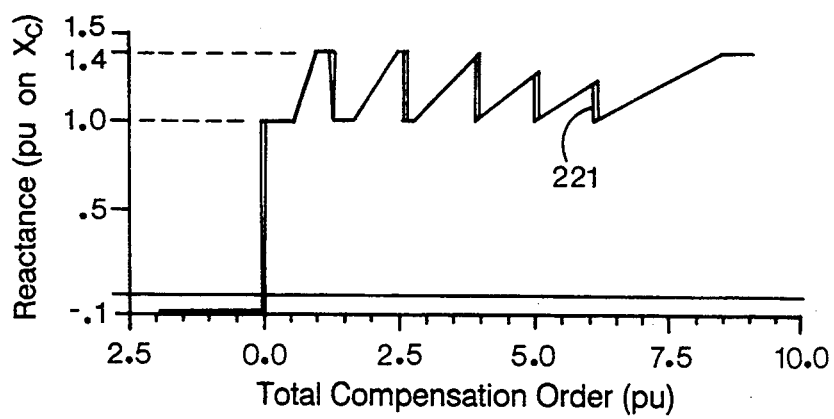
Figure 13E:
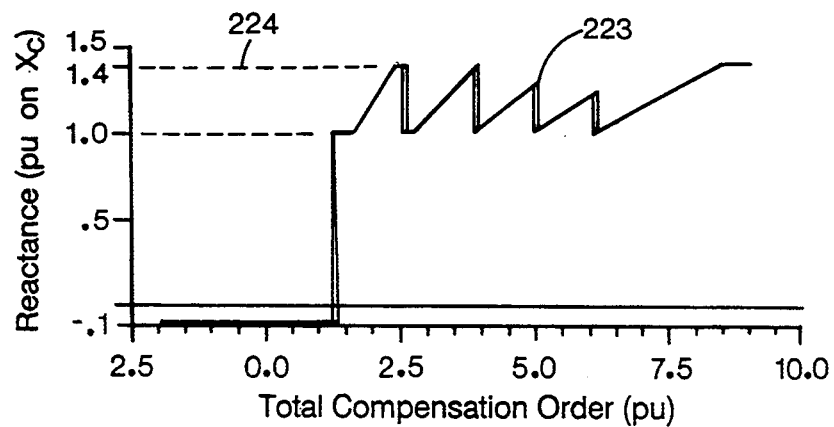
Figure 13F:
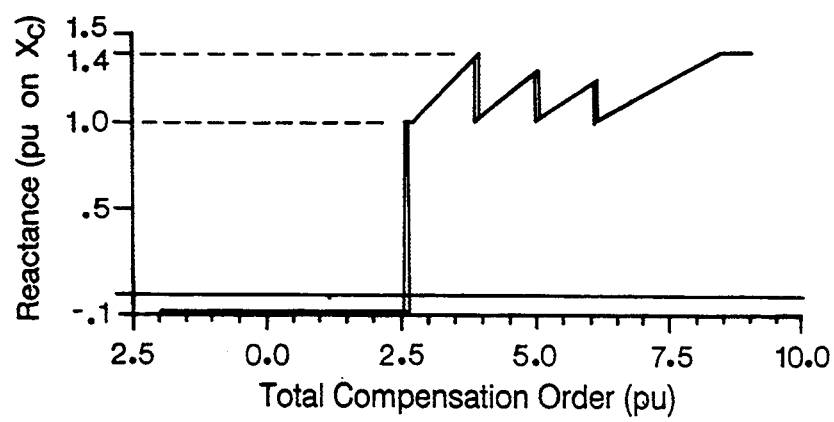
Figure 13G:
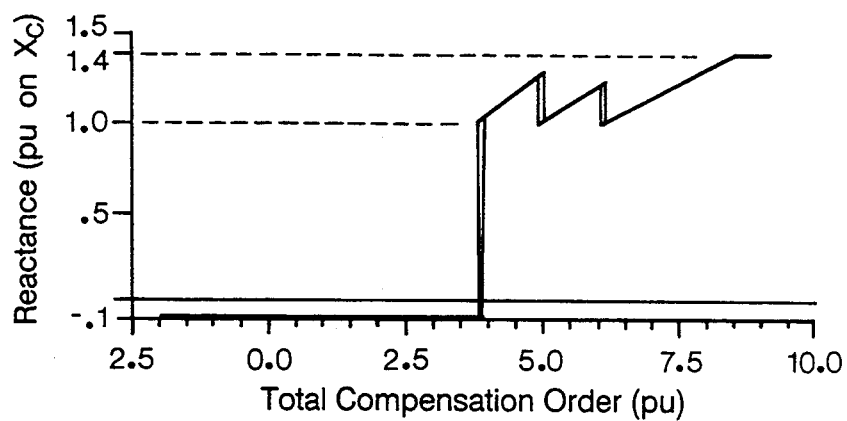
Figure 13H:
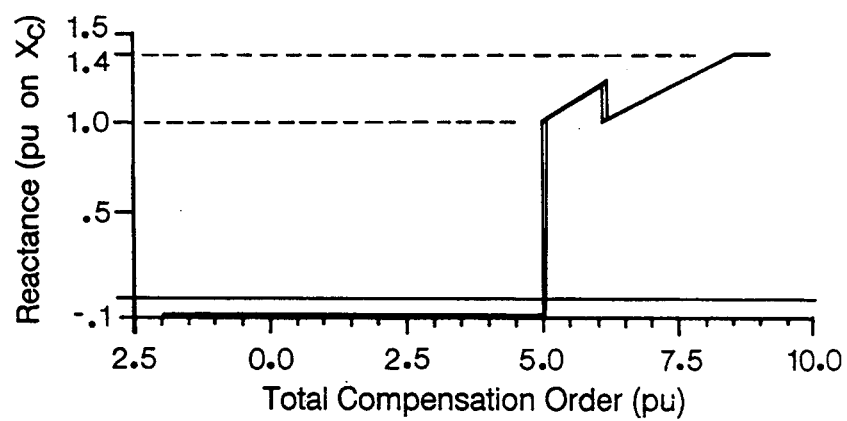
Figure 13I:
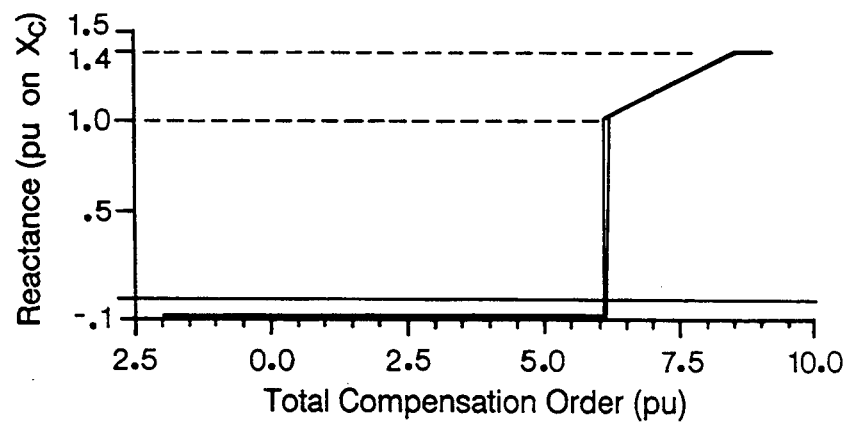
Figure 14B:
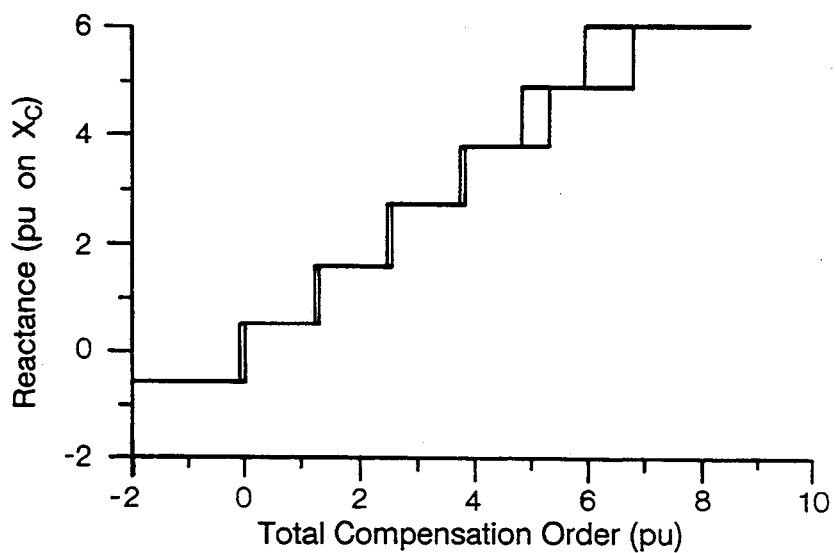
Figure 14C:
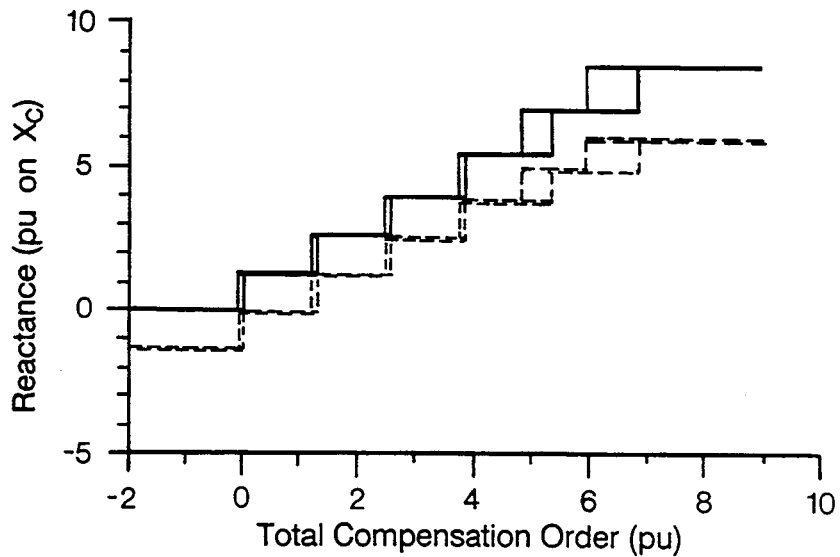

FIGS. 13B and 14B illustrate the total actual compensation without vernier control, which results in step-wise plots, as suffered in the earlier systems discussed in the background portion above. FIGS. 13C and 14C illustrate the upper and lower thresholds for inserting or bypassing the modules, with the upper thresholds being shown in solid lines, and the lower thresholds being shown in dashed lines. FIGS. 13D–13I and 14D–14I illustrate the impedance contributions of the respective first through sixth modules as the capacitors for each module are sequentially added to and removed from their series coupling with the line.

Figure 14D:
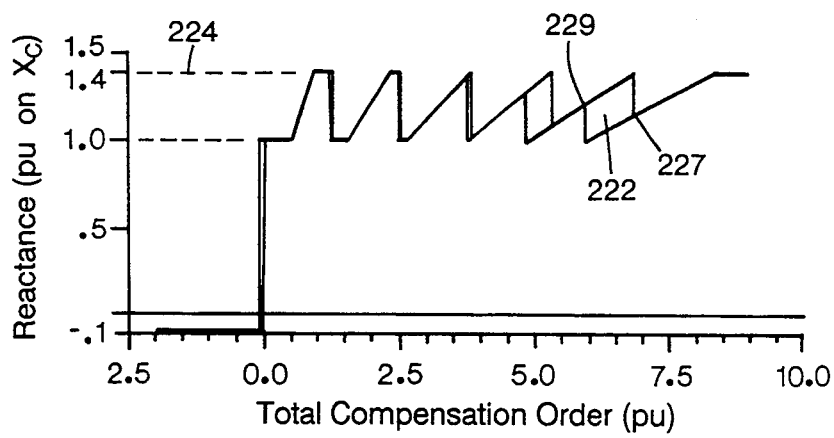
Figure 14E:
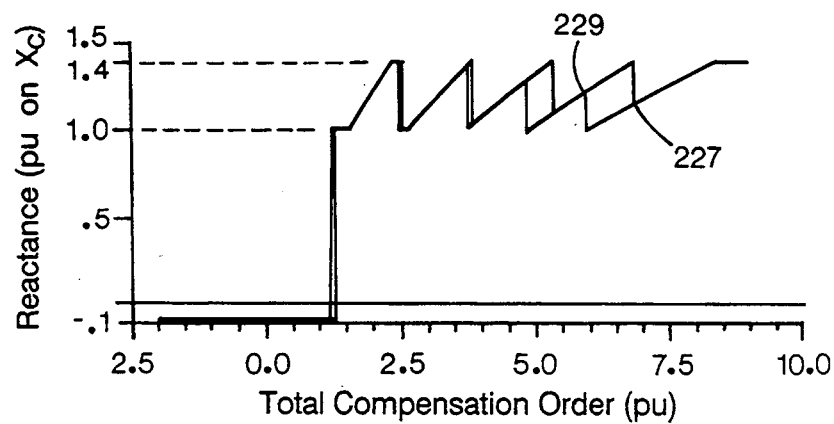

In comparing the graphs, such as FIGS. 13D and 14D, the effect of hysteresis losses in the each module, such as module 25', are apparent In FIG. 13D, the area labeled 221 is very narrow when compared with area 222 in FIG. 14D. The areas 221 and 222 represent the hysteresis of the entire first module 25' under minimum and maximum vernier control, respectively. It is apparent that less losses due to hysteresis are experienced when using the minimum vernier distribution control. An advantage of using maximum vernier control is that the large effective hysteresis, such as area 222, at high levels of compensation prevents repeated inserted and bypass operations, because fluctuations in the ordered compensation remain within this hysteresis region.

FIGS. 13D–13I show minimum vernier distribution control where new modules are added as soon as possible, even if the capability of units already inserted is not fully utilized. For example, for 40% vernier operation, the maximum impedance contribution of each module is 1.40 pu. As shown in FIG. 13E, for example, the fifth module of FIG. 13H is inserted at approximately 5.0 pu of the total compensation order, before the second module's peak contribution 223 has reached a maximum value line 224 at 1.4 pu reactance.

Referring to FIGS. 14D–14I, maximum vernier control logic is shown where all of the vernier capability of one module is used before another module is added. Before a new module is added, all inserted modules reach the 40% maximum vernier limit of 1.4 pu reactance, for instance, indicated by line 224 in FIG. 14D.

Adding and Removing Modules

The insertion and removal of modules will be illustrated with respect to the maximum vernier control scheme of FIGS. 14D–14I. When the compensation order is increased, modules are added by controller 202 so the actual compensation provided approaches the ordered compensation. When adding modules, the reactance values are located along the far right portion of each hysteresis loop, such as indicated at item numbers 225 in FIGS. 14F and 14I.

Figure 14F:
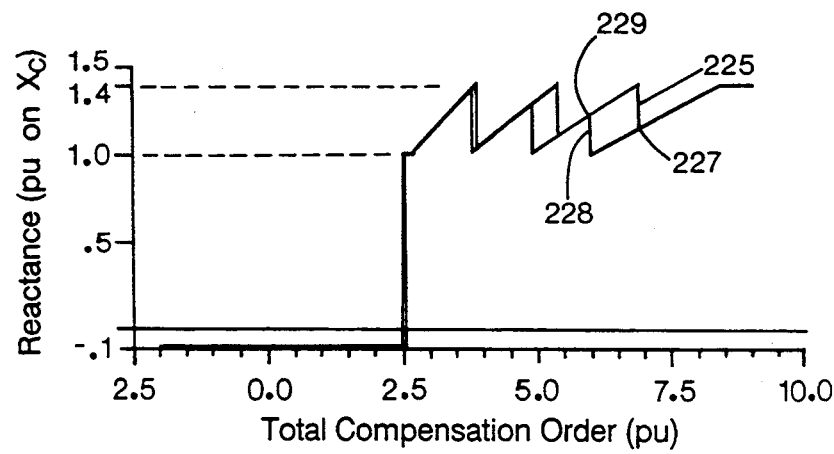
Figure 14G:
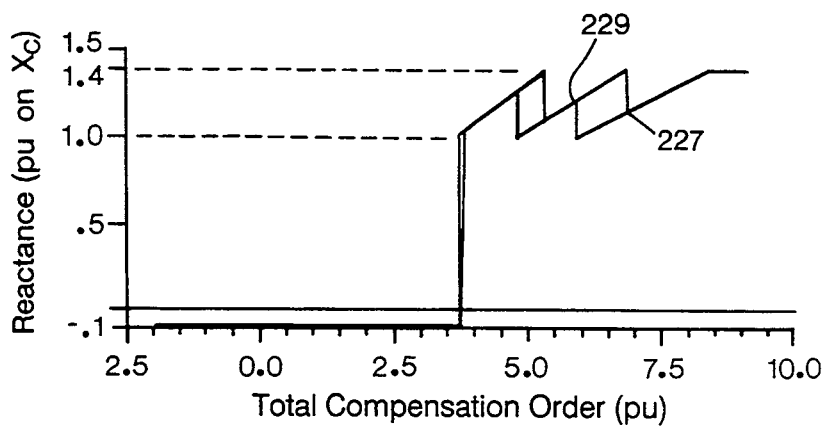
Figure 14H:
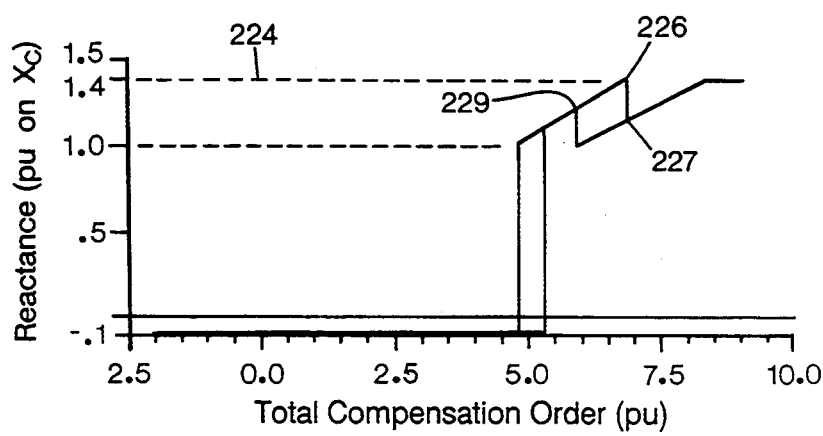
Figure 14I:
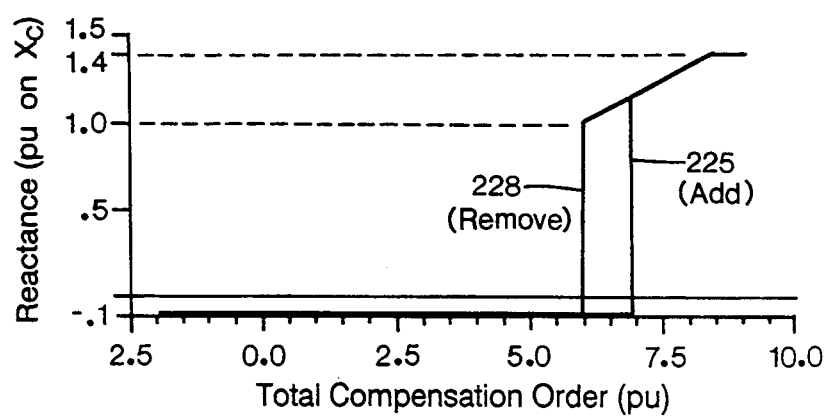

For example, when the fifth module in FIG. 14H has reached a maximum peak 226 at approximately 6.8 pu, the sixth module shown in FIG. 14I is inserted into the transmission line 24. When the additional reactance of the sixth module is inserted, each of the first through fifth modules drops in capacitive reactance to a point indicated at 227, in order to compensate for the additional large step introduced by adding the sixth module.

When removing modules, the reactance values are located along the left portion of the hysteresis loops, such as indicated by numeral 228 in FIGS. 14F and 14I. For example, when the sixth module shown in FIG. 14I is removed at around 6.0 pu of the total compensation order, the first through fifth modules each increase their reactance to a point indicated by numerals 229 to compensate for the large stepwise loss of the sixth module's reactance. That is, before removal of the sixth module, each of the first through fifth modules was operating at the rated value of 1.0 pu reactance.

Operation of the MODL Higher-Level Controller

Referring back to FIG. 10, the MODL higher-level controller 202 provides first, second, and nth final offset ordered ($VFOO_{M1}$, $VFOO_{M2}$ and $VFOO_{Mn}$) or command signals 85', 85" and 85''' to the respective vernier controllers 50', 50" and 50'''. The controllers 50', 50", 50''' may process the command signals 85', 85", 85''' in the same manner as described above for the operation of the vernier controller 50 with respect to signal 85 to generate the firing command signals 48', 48", 48''', respectively. As discussed above with respect to FIGS. 13A through 14I, the change in reactance of the inserted modules when a module is added or removed, is provided by MODL controller 202. For instance, the controller 202 varies the $VFOO_{M1}$ signal 85' to change the firing angle of the thyristor valve 35' in response to insertion or removal of modules 25" or 25'''.

The MODL controller 202 receives high level controller reactance orders from various controllers having often competing requirements for the power flow along the transmission line 24. These controllers may be implemented as control routines or devices, in software, hardware or combinations thereof as known to those skilled in the art, and thus, are referred to herein collectively as control "portions" or "controllers." The control portions may be integral components of the MODL controller 202 as illustrated, or separate devices providing their reactance orders as inputs to the MODL controller 202.

In the following discussion, other components and functions of the MODL controller 202, which may be implemented in software, hardware or combinations thereof known to those skilled in the art to be structurally equivalent, will be referred to herein collectively as "portions" of the controller 202. In one preferred embodiment, the functions of the MODL controller 202 are implemented in software routines.

In the illustrated embodiment, controller 202 receives reactance orders from an operator scheduling control portion 230, a power swing damping control portion 232, a subsynchronous resonance reactance (SSR-X) damping control portion 234, a transient stabilizing control portion 236, and any other control portions, indicated generally as 238. The output orders of the control portions 230-238 are supplied to a module order distribution logic or MODL portion 240.

The MODL portion 240 receives: an $X_{SCHED}$ scheduled reactance order signal 241 from the operator scheduling controller 230; an $X_{PSD}$ power swing damping reactance order signal 242 from the power swing damping controller 232; an $X_{SSR}$ subsynchronous resonance reactance order signal 244 from the SSR-X damping controller 234; an $X_{TSC}$ transient stabilizing control reactance order signal 246 from the transient stabilizing controller 236; and an $X_{OTHER}$ reactance order signal 248 from the "other" control portion 238. The MODL portion 240 also receives the measured line current signal 46 from the line current sensor 44. It is apparent that the $X_{SCHED}$ scheduled reactance order signal 241 may be received directly from a system operator, rather than from controller 230. Alternatively, the system operator may provide a separate operator signal (not shown) to the MODL portion 240.

The MODL portion 240 may generate signals to adjust the firing command signals 85', 85" and 85''' to adjust the compensation of line 24 to a selected value. Alternatively, the controller 202 may adjust the line current flow or the power flow to selected values over line 24 by adjusting the line compensation.

Figure 15:
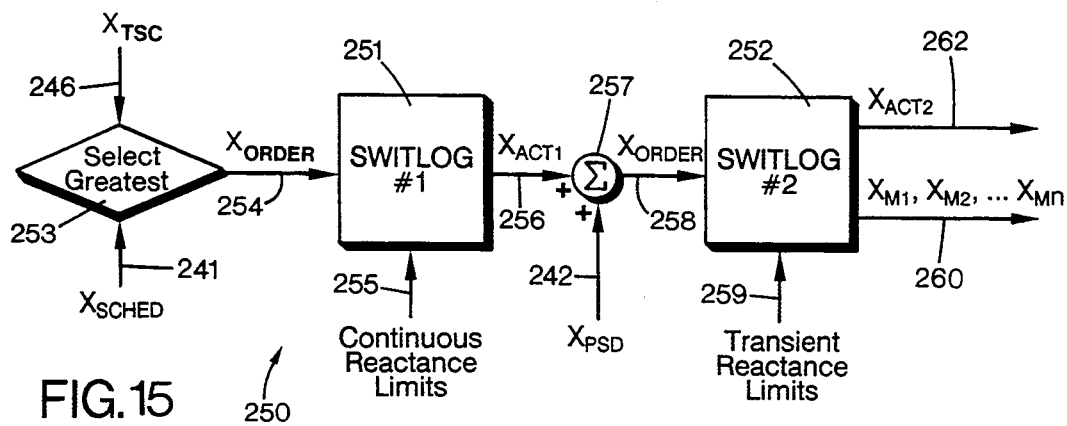
FIG. 15 is a block control diagram of the operation of the MODL higher-level controller of FIG. 10, illustrating a dual stream switching logic approach used to determine when to add or remove a module.

Referring to FIG. 15, an operational diagram 250 of the MODL portion 240 is illustrated. The diagram 250 includes first and second SWITLOG routines 251 and 252, which are illustrated in greater detail below with respect to FIGS. 16A and 16B. The first SWITLOG routine 251 addresses scheduling and transient control needs of controllers 230 and 236. The second SWITLOG routine 252 addresses power swing damping needs of controller 232 to modulate the inserted capacitive reactance in response to power swing disturbances on the line 24.

In a preferred embodiment, the $X_{SSR}$ signal 244 passes from controller 234 directly through the MODL portion 240 and communicates with a dedicated module (not shown), such as module 25', which always remains inserted in series with the line 24. In this manner, continuous SSR damping control is provided to the line 24, independent of the other control requirements. It is apparent that the SSR damping control requirements of controller 234 may be integrated with the requirements of controllers 230, 232, 236 and 238 if more particularly suited for some implementations.

The diagram 250 also has a "select greatest" reactance comparator 253. The comparator 253 receives the $X_{SCHED}$ signal 241 from the operator scheduling controller 230, and the $X_{TSC}$ signal 246 from the transient stabilizing controller 236. The comparator 253 compares signals 241 and 246, selects the signal having the greatest reactance requirements, and issues the selected signal as a first $X_{ORDER}$ signal 254.

The first SWITLOG routine 251 receives the $X_{ORDER}$ signal 254 from the comparator 253. The first SWITLOG portion 251 also receives a continuous reactance limits signal 255, which carries information concerning the continuous reactance limits of the capacitors 30', 30" and 30'''. The first SWITLOG device 251 operates as described further below with respect to FIGS. 16A and 16B to provide an $X_{ACT1}$ actual reactance signal 256 to a summing junction 257. The summing junction 257 adds the $X_{ACT1}$ signal 256 to the power swing damping control reactance $X_{PSD}$ signal 242 to provide a second $X_{ORDER}$ signal 258.

The second SWITLOG portion 252 receives the second $X_{ORDER}$ signal 258 from the summing junction 257. A transient reactance limits signal 259 is also supplied to the second SWITLOG portion 252. The transient reactance limits signal 259 carries information concerning the transient operation reactance limits of capacitors 30', 30" and 30'''. The second SWITLOG device 252 provides an output comprising a group of n module reactance order signals, indicated generally as 260, representing the reactance orders for each of the modules 25', 25" and 25'''. The second SWITLOG portion 252 processes signals 258 and 259 as described further below with respect to FIGS. 16A and 16B to provide an actual reactance $X_{ACT2}$ signal 262. The actual reactance $X_{ACT2}$ signal 262 may be provided, for instance, to a control panel output (not shown) to inform a system operator of the actual reactance ordered.

The $X_{OTHER}$ signal 248 may be combined (not shown) with the control input signals 241 and 246 as a potential input to the first SWITLOG portion 251. Alternatively, the $X_{OTHER}$ signal 248 may be combined (not shown) in a similar manner with the $X_{PSD}$ signal 242 as a potential input to the second SWITLOG portion 252. The exact treatment of the $X_{OTHER}$ signal 248 depends upon what the "other" controller 238 seeks to accomplish. For example, the "other" controller 238 may provide regulation of the line power, the line current, the power angle across the transmission line 24 from the power system 22 to the load 26, etc. In this case, the $X_{OTHER}$ signal 248 may be provided as an input to either the first or the second SWITLOG portions 251 or 252, or neither one, as appropriate for the variable represented.

Figure 16B:
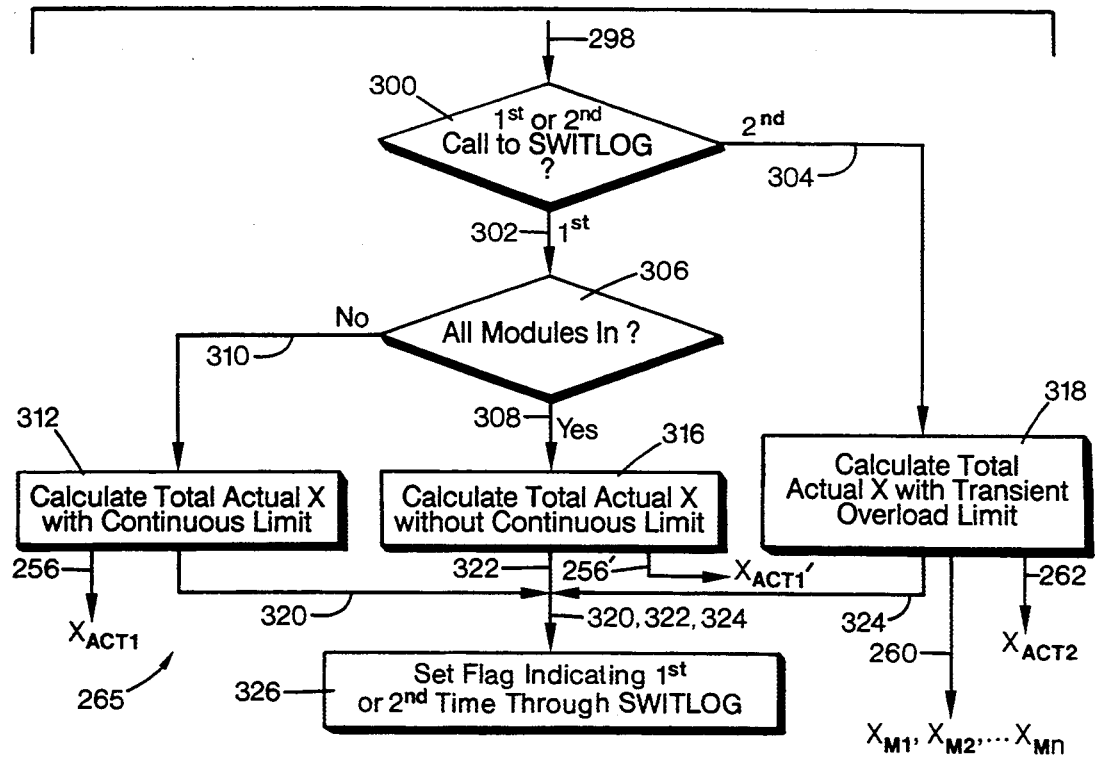
FIGS. 16A and 16B are the respective first and second portions of a flow diagram illustrating one manner of operating the MODL higher-level controller of FIGS. 10 and 15.
Figure 16A:
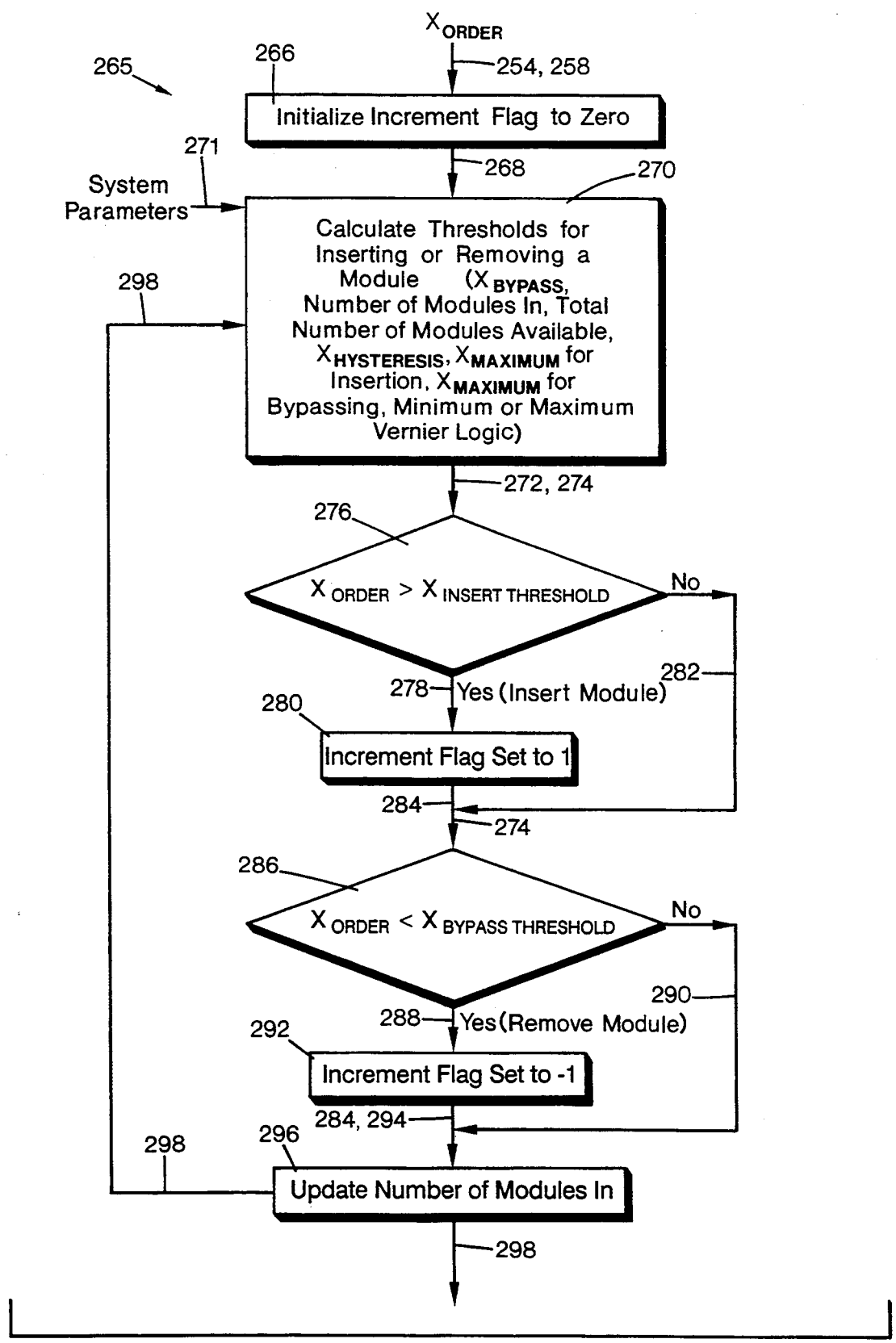

Referring to FIGS. 16A and 16B, a flow diagram 265 illustrates one manner of operating the first and second SWITLOG portions 251 and 252 of the MODL portion 240 to determine when to add or remove a module. The first SWITLOG portion 251 is accomplished by a first pass through the flow diagram 265, and the 252 second SWITLOG portion 252 is accomplished by a subsequent second pass through the flow diagram 265. The first pass 251 is concerned with addressing the continuous operational needs of the system, whereas the second pass 252 is concerned with addressing the short term needs of the system 22. For the first SWITLOG portion 251, the first $X_{ORDER}$ signal 254 is the greater of the $X_{SCHED}$ signal 241 and the $X_{TSC}$ signal 246, as determined by comparator 253. For the second SWITLOG portion 252, on the second pass through the diagram 265, the second $X_{ORDER}$ signal 258 is used as the input to diagram 265. The operation of the SWITLOG portions 251 and 252 will be described generally in terms of $X_{ORDER}$, unless specifically referred to otherwise.

The MODL portion 240 has an initialize increment flag to zero portion 266 which receives the $X_{ORDER}$ signal 254, 258. This flag indicates whether modules will be added or subtracted later, so at the onset of the SWITLOG routine, the flag is reset to zero. The initializing portion 266 provides a reset to zero flag signal 268 to a calculation portion 270. The calculation portion 270 calculates the thresholds for inserting or removing a module using the following variables: $X_{BYPASS}$, the number of modules in series with the line, the total number of modules available, $X_{HYSTERESIS}$, $X_{MAXIMUM\ FOR\ INSERTION}$, $X_{MAXIMUM\ FOR\ BYPASSING}$, and the minimum or maximum vernier logic. The calculation portion 270 also receives a system parameters input signal 271 which represents one or more system parameters, such as line current, line voltage, capacitor voltage and the like.

In general, the switching thresholds for inserting or bypassing a module are functions of the bypass impedance, number of currently inserted modules, total number of available modules, module hysteresis, the maximum reactance limit (either continuous or transient), and system parameters, such as the line current. In addition, the insertion threshold depends upon the choice of minimum or maximum vernier control. Minimum vernier control inserts modules as soon as possible and therefore minimizes losses.. Maximum vernier control inserts a module after all of the currently inserted modules reach the vernier limit and therefore maximizes hysteresis.

Referring to FIGS. 16A and 16B, as described above, the calculation portion 270 provides outputs of an $X_{INSERT\ THRESHOLD}$ signal 272, and an $X_{BYPASS\ THRESHOLD}$ signal 274. In an insert comparison portion 276, the $X_{ORDER}$ signal 254, 258 is compared with the $X_{INSERT\ THRESHOLD}$ signal 272. If the $X_{ORDER}$ signal 254, 258 is greater than (>) the $X_{INSERT\ THRESHOLD}$ signal 272, then a YES signal 278 is sent to an increment flag set to one (1) portion 280, and a module is inserted in series with the line 24. Upon receiving the YES signal 278, the increment portion 280 increments the flag set $\phi$ by a value of one (1), to indicate that another module has been added to the line. If the $X_{ORDER}$ signal 254, 258 is less than the $X_{INSERT\ THRESHOLD}$ signal 272, then the comparison portion 276 issues a NO signal 282 which bypasses the increment flag portion 280.

A new flag value signal 284, whether received from the increment flag set portion 280 or the NO signal 282, is delivered to a bypass threshold comparator 286. The bypass threshold comparator 286 also receives a flow through signal of the $X_{BYPASS\ THRESHOLD}$ signal 274 from the calculation portion 270. The bypass threshold comparator portion 286 issues a YES signal 288 if the $X_{ORDER}$ signal 254, 258 is less than the $X_{BYPASS\ THRESHOLD}$ signal 274. If not, the comparator portion 286 issues a NO signal 290.

Issuance of the YES signal 288 results in a module being removed from the line 24. To indicate the removal of a module, an increment flag set to negative one (−1) portion 292 receives the YES signal 288 from the comparator 286. In response to the YES signal 288, the increment portion, which could also be referred to as a decrement portion, indicates a decrease in the number of modules by issuing a second new flag set signal 294.

If no modules are inserted, as indicated by NO signal 282, and no modules are removed, as indicated by NO signal 290, the present level of compensation is maintained. An update number of modules inserted portion 296 receives either the new flag signal 294, new flag signal 278, which flows through the diagram, or both NO signals 282 and 290. Signal 278 generates an increase in the number of modules, signal 294 generates a decrease, and the NO signals 282 and 290 indicate no change in status. Accordingly, if required, the module update portion 296 updates the number of modules inserted in series with the transmission line 24, and provides a modules inserted update signal 298 as an input to the calculation portion 270.

The modules inserted update signal 298 carries over from FIG. 16A to FIG. 16B, where it is received by a first or second call to SWITLOG decision portion 300. If this is the first pass 251 through, that is, if the calculations are being performed for the first SWITLOG portion 251, a first pass signal 302 is issued. If this is the second pass 252 through for calculations performed by the second SWITLOG portion 252, a second pass signal 304 is issued.

The first pass signal 302 is received by an all modules in determining portion 306. If indeed all modules 25' through 25''' are inserted in series with the line 24, a YES signal 308 is emitted, and if not, a NO signal 310 is emitted.

If on the first pass 251, and all modules are not yet inserted, the NO signal 310 is received by a first calculate total actual reactance portion 312. The calculation portion 312 calculates the total actual reactance using the continuous reactance limits signal 255. The calculation portion 312 provides an output of the first actual reactance $X_{ACT1}$ signal 256, also shown in FIG. 15.

If on the first pass 251, and all the modules are indeed inserted, the YES signal 308 is received by a second calculate total actual reactance portion 316. Since all the modules are inserted in series with the line, the continuous reactance limits 255 of the capacitors 30', 30" and 30''' are no longer of concern because it is desirable for the operator to have the ability to use some of the short term overload capability, such as the 30 minute overload capability shown in regions 206 and 214 of FIG. 11. Thus, the calculation portion 316 calculates the total actual reactance without using the continuous reactance limits 255, to produce an actual reactance $X_{ACT1}'$ signal 256'.

If on the second pass 252, a calculate total actual reactance portion 318 receives the second pass signal 304. Since during the second pass, the system is concerned with addressing short term disturbances of the power line 24, the calculation portion 318 calculates the total reactance $X_{ACT2}$ signal 262 using the transient overload reactance limits 259, as shown in FIG. 15. The other output of the calculation portion 318 are the n module reactance order signals $X_{M1}$, $X_{M2}$, $X_{Mn}$, referred to collectively as reactance order signals 260 (see FIGS. 10 and 15).

Upon completing their calculations, the calculation portions 312, 316 and 318 emit the respective completed calculation signals 320, 322, and 324. The MODL portion 240 includes a final flag setting portion 326. The flag setting portion 326 sets a flag indicating completion of the: first pass 251 through the control scheme 265 upon receipt of signals 320 or 322. The flag setting portion 326 sets a second pass flag upon receiving signal 324, which indicates that the second pass 252 has just been completed.

Referring back to FIG. 10, the $X_{M1}$, $X_{M2}$, and $X_{Mn}$ reactance order signals 260 are received by a voltage order conversion portion 330 of the MODL controller 202. The conversion portion 330 also receives the measured line current signal 46 from the line current sensor 44. Given these inputs, the conversion portion 330 converts the $X_{M1}$, $X_{M2}$ and $X_{Mn}$ reactance order signals 260 into the respective $VFO_{M1}$, $VFO_{M2}$ and $VFO_{Mn}$ final offset voltage signals 332, 334 and 336.

The MODL controller 202 may also have a separate subsynchronous resonance voltage (SSR-V) controller 340 for providing an additional subsynchronous resonance compensation refinement to the final offset voltage signals 332, 334 and 336. The SSR voltage controller 340 may be implemented in a variety of different manners known to those skilled in the art.

For example, one suitable manner of providing vernier control for subsynchronous resonance mitigation is disclosed in U.S. patent application Ser. No. 07/883,474, filed on May 15, 1992, which is hereby incorporated by reference, particularly for its teachings concerning subsynchronous resonance mitigation in a TCSC system. It is noted that the '474 application is a continuation-in-part application based partially upon U.S. application Ser. No. 07/806,768, granted U.S. Pat. No. 5,202,583, referenced in the first paragraph of the specification, above, and each of these three applications has at least one coinventor in common.

In the illustrated embodiment, the SSR voltage controller 340 provides a $V_{SSR}$ subsynchronous resonance voltage signal 342 to each of three summing junctions 344, 346 and 348. The summing junction 344 combines the $V_{SSR}$ signal 342 with the $VFO_{M1}$ signal 332 to provide the final offset order or command $VFOO_{M1}$ signal 85' to the vernier controller 50'. The summing junction 346 combines the $V_{SSR}$ signal 342 with the $VFO_{M2}$ signal 334 to provide the final offset order or command $VFOO_{M2}$ signal 85'' to the vernier controller 50''. The summing junction 348 combines the $V_{SSR}$ signal 342 with the $VFO_{Mn}$ signal 336 to provide the final offset order or command $VFOO_{Mn}$ signal 85''' to the vernier controller 50'''.

Optionally, separate subsynchronous resonance control other than through the MODL controller 202 may be used to provide continual subsynchronous resonance (SSR) mitigation. For example, the modular system 200 may include an optional SSR mitigation higher level controller 350 which provides a final offset ordered ($VFOO_{SSR}$) or command signal 352 to one or more dedicated modules, for instance, to the vernier controller 50'. The controller 350 may operate as described above for controller 340. If the $VFOO_{SSR}$ signal 352 is supplied to controller 50', then the controller 50' does not receive the $VFOO_{M1}$ signal 85' from the MODL controller 202. The remaining controllers 50'' and 50''' continue to receive their command signals 85'' and 85''' from the MODL controller 202.

Regarding the three types of SSR control provided in the illustrated embodiment, the SSR-X damping controller 234, the SSR-V control portion 340, and the optional SSR controller 350, any one, any two or all three may be used in a given implementation. As is known to those skilled in the art, solving the subsynchronous resonance problem may use a multi-pronged approach. Thus, in some implementations, it may be useful to use all three approaches 234, 340 and 350 to emphasize the positive aspects and minimize the negative aspects.

Performance of the Modular TCSC System

Figure 17A:
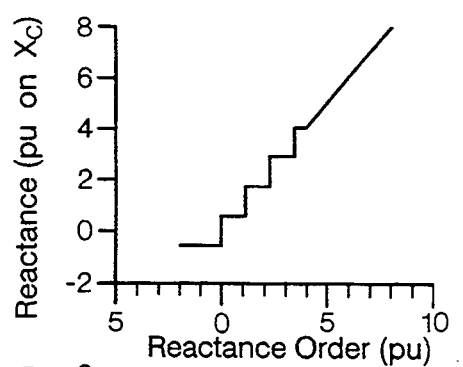
FIGS. 17A–17E, 18A–18E and 19A–19E are graphs illustrating the actual reactance, and the reactance orders for the first, second, third and fourth modules, respectively, of a four module embodiment of the TCSC system of FIG. 10, in response to first an increasing then a decreasing reactance order for three types of operation of the MODL higher-level controller.
Figure 17B:
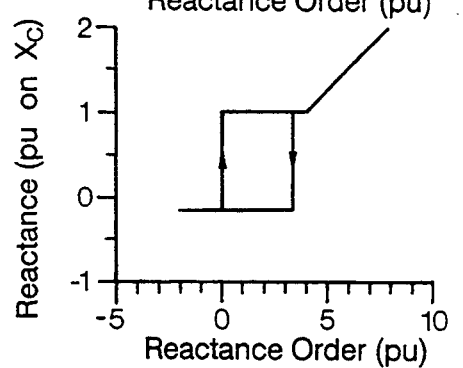
Figure 17C:
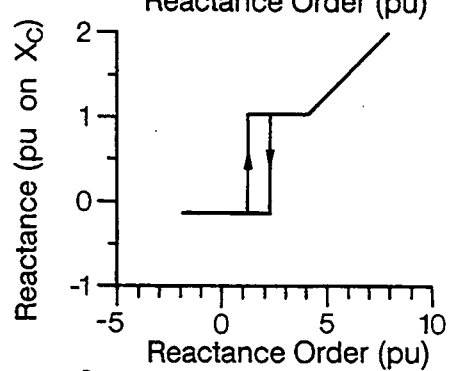
Figure 17D:
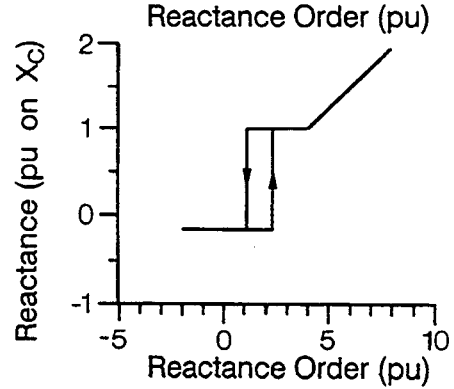
Figure 17E:
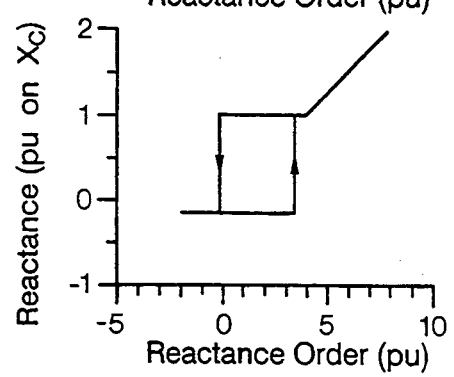
Figure 18A:
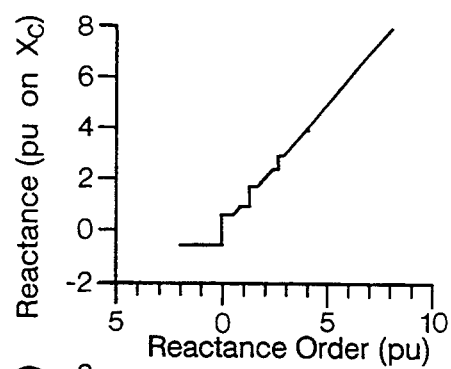
Figure 18B:
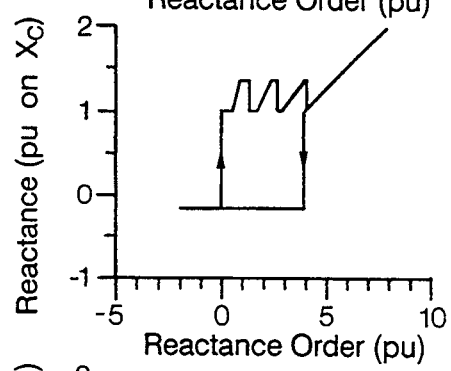
Figure 18C:
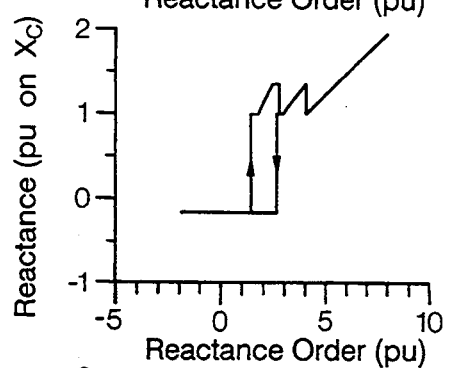
Figure 18D:
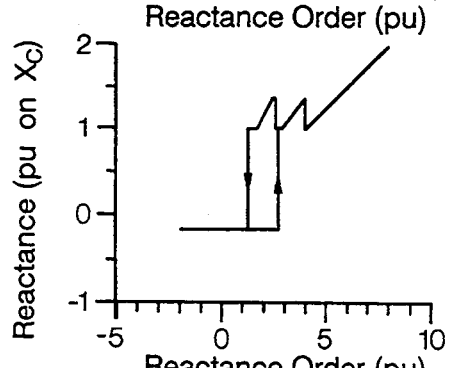
Figure 18E:
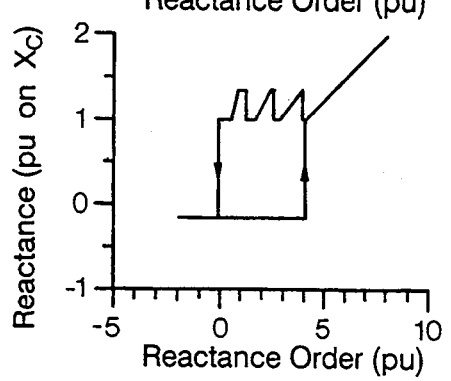
Figure 19A:
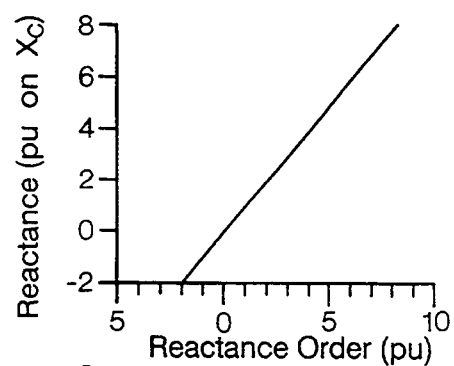
Figure 19B:
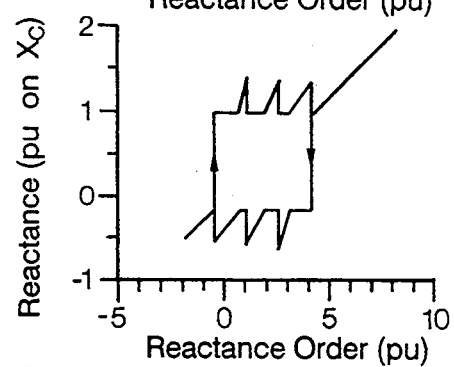
Figure 19C:
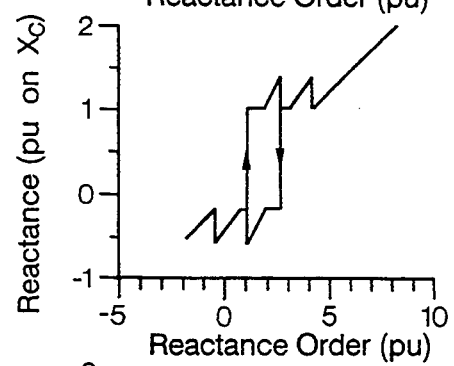
Figure 19D:
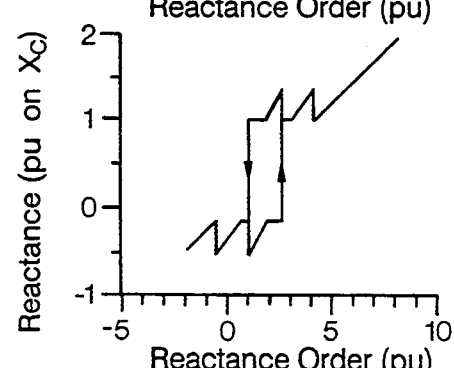
Figure 19E:
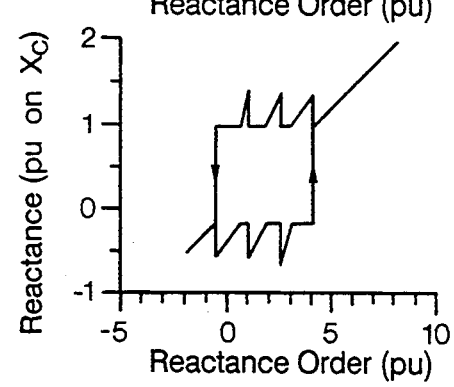

Referring to FIGS. 17A-17E, 18A-18E and 19A-19E, the examples of MODL operation are illustrated for a four-module TCSC system 200. Each module has a bypass impedance of −0.15 pu and an inserted impedance of between 1.0 pu and 1.25 pu (maximum vernier). FIGS. 17A, 18A and 19A are plots of total actual TCSC reactance, and FIGS. 17B-17E, 18B-18E, and 19B-19E are plots of individual module reactances as a function of the reactance compensation order.

Three types of MODL operation are illustrated in response to an increasing, and then a decreasing, reactance order. FIGS. 17A-17E show minimum loss operation. Losses are minimized by preventing any vernier operation until all modules are inserted. Therefore, the actual TCSC reactance increases in steps until the fourth module is inserted. Beyond that point the actual reactance exactly matches the ordered reactance.

FIGS. 18A-18E show minimum vernier operation in the capacitive region only. The actual reactance becomes increasingly smooth as more modules are added and more vernier range is available. FIGS. 19A-19E show minimum capacitive vernier operation and inductive operation of the bypassed modules. The inductive portion of operation is illustrated along the bottom portion of each graph in FIGS. 19B-19E. Such inductive operation may be accomplished by ordering partial conduction of the thyristors 36a and 36b by changing the firing angle. Inductive operation through partial conduction of thyristors, by itself, has been done by others in the past, but never in combination with capacitive vernier operation described above. In the illustrated embodiment, the actual reactance exactly matches the ordered reactance over its entire range in FIG. 19A by using both inductive reactance operation and capacitive reactance operation.

Conclusion

Having illustrated and described the principles of our invention with respect to a preferred embodiment, it should be apparent to those skilled in the art that our invention may be modified in arrangement and detail without departing from such principles. For example, other combinations of hardware and software may be used to implement the functions of the vernier controller 50 and MODL higher-level controller 202 described herein. Furthermore, other types of monitors and signal processors may be used to provide the measured line current $I_{LM}$, the measured capacitor voltage $V_{CM}$, and the measured thyristor ampseconds ASPM to the vernier controller 50. Such structural equivalents for the monitors and the components of the vernier controller 50 and the MODL higher-level controller 202 are known to be interchangeable by those skilled in the art and may be substituted herein. Moreover, while the MODL higher-level controller 202 has been described for use in the modular TCSC system 200, it is apparent that the MODL controller 202 may be useful for other applications having multiple modules with step-wise and vernier capability. We claim all such modifications falling with the scope and spirit of the following claims.

We claim:

1. A reactive power compensation apparatus, comprising:
   a plurality of compensation modules, each of said compensation modules including
      a capacitor electrically connected in series with a transmission line, and
      a bypass circuit, responsive to a control signal, to electrically remove said capacitor from said transmission line; and
   a controller to generate control signals to selectively deactivate or activate said bypass circuits of said plurality of compensation modules, said controller including
      an operator scheduling controller to generate a scheduling order,
      a power swing damping controller to generate a power swing damping order,
      a transient stabilizing controller to generate a transient stabilizing order, and
      a module order distribution logic system to receive and balance the competing needs of said scheduling order, said power swing damping order and said transient stabilizing order to generate a set of control signals for said bypass circuits of said plurality of compensation modules.

2. The reactive power compensation apparatus of claim 21 further comprising:
   a subsynchronous resonance reactance damping controller to generate a subsynchronous resonance order;
   a subsynchronous resonance mitigation compensation module including a capacitor electrically connected in series with said transmission line and a bypass circuit, responsive to said subsynchronous resonance order, to modulate the reactive power compensation provided by said capacitor and thereby provide continuous subsynchronous resonance damping control.

3. The reactive power compensation apparatus of claim 1 wherein said controller selectively executes:
   a minimum vernier control strategy to insert said compensation modules even if the vernier capability of previously inserted compensation modules is not fully utilized, and
   a maximum vernier control strategy to wait until the vernier capability of all previously inserted compensation modules is fully utilized prior to inserting a new compensation module.

4. A method of providing reactive power compensation to a transmission line, said method comprising the steps of:
   generating a scheduling order;
   generating a power swing damping order;
   generating a transient stabilizing order;
   processing said scheduling order, said power swing damping order and said transient stabilizing order to generate a set of control signals; and
   applying said set of control signals to a plurality of compensation modules, each of said compensation modules including a compensating capacitor connected in series with a transmission line and a bypass switch to electrically connect and disconnect said capacitor with said transmission line.

5. The method of claim 4 further comprising the steps of:
   generating a subsynchronous resonance order; and
   applying said subsynchronous resonance order to a subsynchronous resonance mitigation compensation module including a capacitor electrically connected in series with said transmission line and a bypass switch responsive to said subsynchronous resonance order, to modulate the reactive power compensation provided by said capacitor and thereby provide continuous subsynchronous resonance damping control to said transmission line.

6. The method of claim 5 further comprising the steps of:
   executing a minimum vernier control strategy to insert said compensation modules even if the vernier capability of previously inserted compensation modules is not fully utilized, and
   executing a maximum vernier control strategy to wait until the vernier capability of all previously inserted compensation modules is fully utilized prior to inserting a new compensation module.

* * * * *